United States Patent
Biver et al.

(10) Patent No.: US 9,841,652 B2
(45) Date of Patent: Dec. 12, 2017

(54) ELECTROCHROMIC COMPOSITION

(71) Applicant: ESSILOR INTERNATIONAL (COMPAGNIE GENERALE D'OPTIQUE), Charenton-le-Pont (FR)

(72) Inventors: Claudine Biver, Charenton-le-Pont (FR); Samuel Archambeau, Charenton-le-Pont (FR); Fabien Berit-Debat, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 117 days.

(21) Appl. No.: 15/022,821

(22) PCT Filed: Sep. 16, 2014

(86) PCT No.: PCT/EP2014/069730
§ 371 (c)(1),
(2) Date: Mar. 17, 2016

(87) PCT Pub. No.: WO2015/040029
PCT Pub. Date: Mar. 26, 2015

(65) Prior Publication Data
US 2016/0231636 A1    Aug. 11, 2016

(30) Foreign Application Priority Data
Sep. 17, 2013 (EP) .................................. 13184812

(51) Int. Cl.
  G02F 1/153  (2006.01)
  G02F 1/15   (2006.01)
  C09K 9/02   (2006.01)
  G02C 7/10   (2006.01)

(52) U.S. Cl.
  CPC ............. *G02F 1/1521* (2013.01); *C09K 9/02* (2013.01); *G02C 7/101* (2013.01); *C09K 2211/1007* (2013.01); *C09K 2211/1011* (2013.01); *C09K 2211/1029* (2013.01); *C09K 2211/1044* (2013.01); *G02F 2001/1502* (2013.01); *G02F 2001/1515* (2013.01)

(58) Field of Classification Search
  CPC .................................................. G02F 1/1521
  USPC ........................................................ 359/275
  See application file for complete search history.

(56) References Cited

U.S. PATENT DOCUMENTS

| | | | |
|---|---|---|---|
| 4,116,535 A | 9/1978 | Ponjee et al. | 359/272 |
| 5,278,693 A | 1/1994 | Theiste et al. | 359/272 |
| 5,438,024 A | 8/1995 | Bolton et al. | 501/55 |
| 5,998,617 A | 12/1999 | Srinivasa et al. | 544/347 |
| 6,141,137 A | 10/2000 | Byker et al. | 359/265 |
| 6,255,238 B1 | 7/2001 | Brocheton | 501/56 |
| 7,106,489 B2 | 9/2006 | Berneth et al. | 359/273 |
| 8,736,946 B2 | 5/2014 | Archambeau et al. | 359/275 |
| 2002/0027700 A1 | 3/2002 | Berneth et al. | 359/265 |
| 2005/0231784 A1* | 10/2005 | Shinohara | B82Y 20/00 359/265 |
| 2009/0082570 A1 | 3/2009 | Nii et al. | 546/258 |
| 2011/0235150 A1 | 9/2011 | Das et al. | 539/273 |

FOREIGN PATENT DOCUMENTS

| | | |
|---|---|---|
| EP | 0180204 | 5/1986 |
| EP | 1156098 | 11/2001 |
| EP | 2407526 | 1/2012 |
| EP | 2848667 | 3/2015 |
| EP | 2848668 | 3/2015 |
| FR | 2937154 | 4/2010 |
| FR | 2950710 | 4/2011 |
| GB | 1514466 | 6/1978 |
| JP | S52135884 | 11/1977 |
| JP | 55437080 A | 3/1979 |
| JP | H11106376 | 4/1999 |
| WO | WO 98/44384 | 10/1998 |
| WO | WO 2006/013250 | 2/2006 |
| WO | WO 2008/028930 | 3/2008 |
| WO | WO 2010/024840 | 3/2010 |
| WO | WO 2011/082354 | 7/2011 |
| WO | WO 2015/040030 | 3/2015 |
| WO | WO 2015/040031 | 3/2015 |
| WO | WO 2015/040033 | 3/2015 |

OTHER PUBLICATIONS

Database CA [Online] Chemical Abstracts Service, Columbus, Ohio, US; 1982 "Composition for electrochromic displays", XP002724222, retrieved from STN Database accession No. 1982:605815 abstract—& JP 57 057779 A (Mitsubishi Electric Corp., Japan) Apr. 7, 1982 (Apr. 7, 1982).

Database CA [Online] Chemical Abstracts Service, Columbus, Ohio, US; 1980, "Electrochromic substances for display devices", XP002724143, retrieved from STN Database accession No. 1980:613419 abstract—& JP 55 054381 A (Hitachi, Ltd., Japan) Apr. 21, 1980 (Apr. 21, 1980).

Clennan et al., "Pyrylogens: Synthesis, Structural, Electrochemical, and Photophysical Characterization of a New Class of Electron Transfer Sensitizers", *J Am Chem Soc*, 130(24): 7552-3, 2008.

(Continued)

*Primary Examiner* — James Jones

(74) *Attorney, Agent, or Firm* — Norton Rose Fulbright US LLP

(57) ABSTRACT

The present invention relates to an electrochromic composition comprising at least one reducing compound, at least one oxidizing compound which is selected from specific viologen derivatives, and at least one dye. Said composition can be used as a variable transmittance medium for the manufacture of an optical article, such as an ophthalmic lens.

17 Claims, No Drawings

(56) References Cited

OTHER PUBLICATIONS

Downes, "Aryl-substituted Derivatives of 4,4'-Bipyridylium Salts: their Spectroscopic Properties and Stereochemistry", *J. Chem. Soc. (C)*, p. 1491-1493, 1967.
International Search Report and Written Opinion issued in PCT/EP2014/069731, dated Apr. 10, 2015.
International Search Report and Written Opinion issued in PCT/EP2014/069737, dated Apr. 15, 2015.
International Search Report and Written Opinion issued in PCT/EP2014/069730, dated Apr. 15, 2015.
International Search Report and Written Opinion issued in PCT/EP2014/069734, dated Oct. 6, 2014.

* cited by examiner

ELECTROCHROMIC COMPOSITION

CROSS-REFERENCE TO RELATED APPLICATIONS

This application is a national phase application under 35 U.S.C. §371 of International Application No. PCT/EP2014/069730 filed 16 Sep. 2014, which claims priority to European Patent Application No. 13184812.9 filed 17 Sep. 2013. The entire contents of each of the above-referenced disclosures is specifically incorporated by reference herein without disclaimer.

The present invention relates to an electrochromic composition comprising at least one reducing compound, at least one oxidizing compound selected from specific viologen derivatives and at least one dye. Said composition can be used as a variable transmittance medium for the manufacture of an optical article, such as an ophthalmic lens.

Electrochromism is a well-known physical phenomenon which is observed with certain classes of chemical compounds that change reversibly colour when a voltage is applied to them. The material undergoes reversible changes in optical properties by oxidation and reduction. Usually, the electrochromic material may be colourless when an electric field is not applied and may be coloured when an electric field is applied. An electrochromic device, i.e. device containing electrochromic compounds, the absorbance of which depends only on the presence of electric field, can thus have two states, a coloured state (when electrically activated) and a bleached state (in the inactive state). The optical transmission properties of the device depend on the electrochromic compounds.

Electrochromism may be applied to various applications. For instance, in the ophthalmic field, electrochromic lenses may enable the user to actively control the darkening of the lens under some illumination conditions, so as to provide ocular protection, and commute rapidly when these conditions change, contrary to photochromic lenses which passively darken under UV radiation and furthermore require some time to bleach again when the UV radiation stops. Moreover, photochromic dyes are usually incorporated into ophthalmic lenses by an imbibition (or impregnation) process which is not suited for any ophthalmic substrate. Electrochromic glasses have also been used in the manufacture of "smart windows" or rear-view mirrors. Usually, all these electrochromic devices are made from an electrochromic composition comprising, besides an electrochromic compound, a redox promoter or reducer, and a solvent.

When preparing an electrochromic composition to be used as transparent media for forming high quality optical articles, in particular high quality ophthalmic lenses, the choice of electrochromic compounds is critical. Indeed, electrochromic compounds need not only to show good electrochromic properties such as high absorption of the visible light in the coloured state, low absorption of visible radiations in the bleached state, fast colouring and fading rates, but should also have long-term stability, in particular in the presence of oxygen, and good solubility in conventional solvents. Gathering all the required properties in one single compound is a real challenge. Many studies have already been conducted for providing electrochromic compounds having the best compromise. For example, viologen compounds have been identified as compounds of particular interest due to their high molar absorption coefficient. Their molar absorption coefficient is indeed higher than other electrochromic compounds, such as ferrocene or dihydrophenazine derivatives, usually used in electrochromic devices.

However, usual viologen compounds are blue when activated, whereas it would be useful to provide an electrochromic composition having a wide range of colours when in the activated state, and in particular neutral colours (i.e. brown, grey, grey-green . . . ) which are widely used for sunglasses or other colours that would meet the consumers demand, and for instance match with specific spectacle frames, whereas, in the inactive state (i.e. when no voltage is applied) the composition is less coloured, with a wide range of possible colours, or even uncoloured. Such a neutral colour can be preferentially chosen with respect of the ISO Standard 1836, which defines the relative visual attenuation coefficient of filters of categories 0, 1, 2 and 3. Other examples of tints defining a neutral colour are given in documents U.S. Pat. No. 6,255,238 and U.S. Pat. No. 5,438,024.

After conducting extensive research, the present inventors provide an electrochromic composition comprising at least one oxidizing compound selected from viologen derivatives of formula (I) and (II), in addition to a reducing compound and a dye. The viologen derivatives of formula (I) and (II) can show a wide variety of colours in their coloured states, including red, blue and green, which enables obtaining the desired colour for the electrochromic composition of the invention. In particular, the colour of the electrochromic composition can be adapted to the desired colour without the need of a specifically coloured electrochromic reducing compound. In other words, the suitable reducing compound can be chosen focusing on other properties such as transparency, stability or solubility, regardless of the coloured state that such a reducing compound may have. The suitable compounds of formula (I) and/or (II) can be chosen, possibly taking into account the colour of the reducing compounds, so as to obtain the electrochromic composition having the desired colour in the coloured state. Moreover, the dye added to the electrochromic composition provides it with the required colour or allows altering the absorbance of the composition of this invention when it is not electrically activated, in in such a way that the composition absorbs light in one or several wavelength ranges of the visible spectrum.

The present invention relates more particularly to an electrochromic composition comprising:
- at least one reducing compound;
- at least one electrochromic oxidizing compound; and
- at least one dye, wherein said electrochromic oxidizing compound is selected from viologen derivatives of formula (I) and (II):

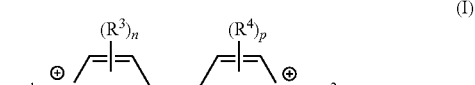

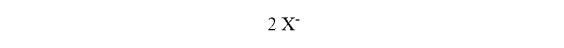

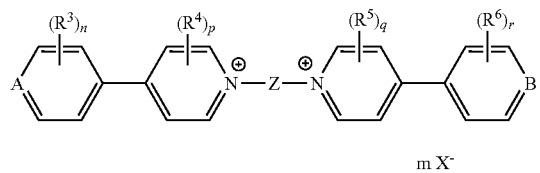

wherein
R$^1$ and R$^2$ are each independently selected from optionally substituted phenyl groups;

R$^3$, R$^4$, R$^5$ and R$^6$ are each independently selected from H, alkyl, alkoxy, alkylthio, haloalkyl, haloalkoxy, haloalkythio, polyakylenoxy, alkoxycarbonyl, aryl, substituted aryl, heteroaryl and substituted heteroaryl, wherein the alkyl group may be substituted by one or more substituents independently selected from alkoxy, cycloalkyl, aryl, substituted aryl, heteroaryl and substituted heteroaryl;

n, p, q and r are each independently an integer from 0 to 4, wherein when n, p, q or r are two or more, each of the R$^3$, each of the R$^4$, each of the R$^5$ or each of the R$^6$ may be identical or different;

A and B are respectively selected from nitrogen and —N$^+$(R$^{7a}$)—, and from nitrogen and —N$^+$(R$^{7b}$)—, wherein R$^{7a}$ and R$^{7b}$ are independently selected from:

alkyl which may be substituted by one or more groups independently selected from halogen, alkoxy, cycloalkyl, vinyl, allyl, aryl, substituted aryl, heteroaryl and substituted heteroaryl;

aryl and heteroaryl which may be both substituted by one or more groups independently selected from: halogen, cyano, nitro, alkyl, haloalkyl, arylalkyl, cycloalkyl, cycloalkylalkyl and heterocycloalkylalkyl, alkenyl, alkynyl, allyl, vinyl, aryl, substituted aryl, heteroaryl, substituted heteroaryl, —N(aryl)$_2$, —N(aryl)CO(aryl), —CO-aryl and —CO-substituted aryl;
—OR$^8$, —SR$^8$, —S(O)R$^8$, —S(O$_2$)R$^8$, —S(O$_2$)NR$^8$R$^9$, —NR$^8$R$^9$, —NR$^8$COR$^9$, —NR$^8$CO(aryl), —NR$^8$aryl, —CH$_2$OR$^8$, —CH$_2$SR$^8$, —CH$_2$R$^8$, —CO—R$^8$ and —CO$_2$R$^8$ wherein R$^8$ and R$^9$ are independently selected from H, alkyl, haloalkyl, arylalkyl, cycloalkyl, cycloalkylalkyl and heterocycloalkylalkyl;

—S(O$_2$)NR$^{10}$R$^{11}$ and —NR$^{10}$R$^{11}$, wherein R$^{10}$ and R$^{11}$ form together with the nitrogen atom to which they are linked a saturated 5 to 7 membered heterocycloalkyl which may comprise in addition to the nitrogen atom one further heteroatom selected from oxygen, nitrogen and sulphur, and which may be optionally substituted by one or two groups independently selected from halogen, —R$^8$, —OR$^8$, and —NR$^8$R$^9$, wherein R$^8$ and R$^9$ are as defined above;

—V—W—R$^{12}$ wherein:
V is selected from oxygen, —N(R$^8$)—, sulphur, —S(O)— and —S(O$_2$)— wherein R$^8$ is as defined above;
W is alkylene, which may be substituted by one or more groups independently selected from halogen and alkoxy; and
R$^{12}$ is selected from —OR$^8$, —NR$^8$(alkyl) and —SR$^8$ wherein R$^8$ is as defined above; and
—OC(O)—R$^{13}$ wherein R$^{13}$ is selected from alkyl, haloalkyl, alkenyl, —W—R$^{12}$, and aryl group which may be substituted by 1 to 4 groups selected from halogen, —R$^8$, —OR$^8$, —SR$^8$, —NR$^8$R$^9$, —NR$^{10}$R$^{11}$, —CO—R$^8$, —C(O)OR$^8$, wherein R$^8$, R$^9$, R$^{10}$, R$^{11}$, R$^{12}$ and W are as defined above;

Z is selected from
alkylene;
cycloalkylene; and
a bivalent groups of formula —R$^{14}$—Y—R$^{15}$—, wherein R$^{14}$ and R$^{15}$ are each independently selected from single bond, alkylene and cycloalkylene, and Y is selected from arylene, cycloalkylene, heteroarylene, arylene-arylene or arylene-CR'R"-arylene wherein R' and R" form together with the carbon to which they are linked a carbocyclic group;

wherein said alkylene, cycloalkylene, arylene, heteroarylene and carbocyclic groups may be substituted by one or more substituents selected from halogen, alkyl, alkoxy, alkylthio, hydroxyalkyl, acyloxy, cycloalkyl, aryl, substituted aryl, aryloxy heteroaryl and substituted heteroaryl;

m is 2 if A and B are nitrogen, 3 if one of A and B is nitrogen and the other is not nitrogen, and 4 if both A and B are not nitrogen.

X$^-$ is a counterion.

In the context of this description, the term "dye" refers to any substance which is able, optionally when subjected to UV light, to alter the absorbance of the composition of this invention in the inactive state, in such a way that the composition absorbs light in one or several wavelength ranges of the visible spectrum. According to a preferred embodiment, the dye is chosen such that the visual transmittance of the composition containing it is higher than 18%, when in the inactive state, optionally when subjected to UV light.

It is specified that the transmission level or visual transmittance (Tv) of the lens is measured according to the ISO Standard 8980-3, in the 380 nm-780 nm wavelength range, using a spectrophotometer. It corresponds to the transmission factor as defined in the ISO Standard 13666:1998.

The expression "alkylene" represents any divalent radical of a linear or branched hydrocarbon chain comprising 1 to 12 carbon atoms. Examples of C$_1$-C$_{12}$ alkylene groups include C$_1$-C$_4$ alkylene groups such as —CH$_2$—, —(CH$_2$)$_2$—, —(CH$_2$)$_3$—, —(CH$_2$)$_4$—, —CH(CH$_3$)—, —CH(CH$_3$)—CH$_2$—, —CH$_2$—CH(CH$_3$)—, —(CH$_2$)$_2$—CH(CH$_3$)—, —CH$_2$—CH(CH$_3$)—CH$_2$— or —CH(CH$_3$)—(CH$_2$)$_2$—, as well as —(CH$_2$)$_5$—, —(CH$_2$)$_6$—, —(CH$_2$)$_2$—CH(CH$_3$)—(CH$_2$)$_2$—, —(CH$_2$)$_3$—CH(CH$_3$)—CH$_2$—, —(CH$_2$)$_7$—, —(CH$_2$)$_8$—, —(CH$_2$)$_9$—, —(CH$_2$)$_{10}$—, —(CH$_2$)$_{11}$—, —(CH$_2$)$_{12}$.

The expression "cycloalkylene" represents any any divalent radical of a monocyclic or bicyclic 3 to 12 membered carbocycle. Examples of C$_3$-C$_{12}$ alkylene groups include cyclopropylene, cyclopentylene, cyclohexylene, cycloheptylene, and decahydronaphthylene.

The expression "arylene" represents any divalent radical of an aromatic hydrocarbon comprising 6 to 18 carbon atoms. Examples of C$_6$-C$_{18}$ arylene groups include phenylene, naphthylene, anthracenylene and phenanthrenylene.

The expression "carbocyclic group" represents any monocyclic or fused polycyclic hydrocarbon rings comprising 3 to 20 carbon atoms and which may comprise one or more unsaturations. Examples of C$_3$-C$_{20}$ carbocyclic groups include C$_{10}$-C$_{20}$ fused hydrocarbon rings which may comprise one or more unsaturations, such as cyclohexenylene, indene, fluorene.

The expression "halogen" includes F, Cl, Br or I. Preferred halogens are F and Cl.

The expression "alkyl" represents any monovalent radical of a linear or branched hydrocarbon chain comprising 1 to 18 carbon atoms. Examples of C$_1$-C$_{18}$ alkyl groups include C$_1$-C$_4$ alkyl groups such as methyl, ethyl, n-propyl, i-propyl, n-butyl, i-butyl, s-butyl or t-butyl, C$_6$-C$_8$ alkyl groups such as n-hexyl, n-heptyl or n-octyl, as well as n-pentyl, 2-ethylhexyl, 3,5,5-trimethylhexyl, n-nonyl, n-decyl, n-undecyl, n-dodecyl or n-Octadecyl.

The expression "alkoxy" represents a radical of formula —OR wherein R is a $C_1$-$C_{12}$ alkyl. Examples of $C_1$-$C_{12}$ alkoxy groups include $C_1$-$C_6$ alkoxy groups such as —$OCH_3$, —$OCH_2CH_3$ or $O(CH_2)_5CH_3$.

The expression "cycloalkyl" represents any monovalent radical of a monocyclic or bicyclic 3 to 12 membered saturated carbocycle. Examples of $C_3$-$C_{12}$ cycloalkyl groups include cyclopropyl, cyclopentyl and cyclohexyl.

The expression "aryl" represents any monovalent radical of an aromatic hydrocarbon comprising 6 to 18 carbon atoms. Examples of $C_6$-$C_{18}$ aryl groups include phenyl, naphthyl, anthracenyl and phenanthrenyl.

The expression "substituted aryl" represents any $C_6$-$C_{18}$ aryl group as defined above substituted by one or more substituents selected from halogen, alkyl, alkoxy, alkynyl haloalkyl, haloalkoxy, alkoxycarbonyl, alkanoyl, aroyl, formyl, nitrile, nitro, amido, alkylthio, alkylsulfinyl, alkylsulfonyl, arylthio, arylsulfinyl, arylsulfonyl, amino, alkylamino, arylamino, dialkylamino and diarylamino. Preferably, the substituents are selected from bulky or electron withdrawing groups. Examples of substituted $C_6$-$C_{18}$ aryl groups include substituted phenyl groups such as p-methylphenyl, o-t-butylphenyl, p-trifluoromethoxyphenyl, o-trifluoromethoxyphenyl, m-cyanophenyl, o-i-propylphenyl, 2,4-dinitrophenyl, 2,6-diisopropylphenyl or 3,5-dicyanophenyl.

The expression "aryloxy" represents a radical of formula —OR wherein R is a $C_6$-$C_{18}$ aryl. Examples of $C_1$-$C_{12}$ aryloxy groups include phenyloxy and naphthyloxy.

The expression "heteroaryl" represents any monovalent radical of a monocyclic or bicyclic 5 to 10 membered aromatic group comprising from 1 to 3 heteroatoms independently selected from oxygen, nitrogen and sulfur. Examples of $C_5$-$C_{10}$ heteroaryl groups include furyl, thienyl, pyrrolyl, pyrazoyl, imidazolyl, isoxazolyl, isothiazoyl, thiazolyl, oxazolyl, 1,2,3-triazolyl, 1,2,4-triazolyl, 1-benzofuryl, 1-benzothienyl, indolyl, benzimidazolyl, indazolyl, 1,2-benzisoxazolyl, 2,1-benzisoxazolyl, 1,2-benzisothiazolyl, 2,1-benzisothiazolyl, benzothiazolyl, benzoxazolyl, benzotriazolyl, pyridyl, quinolinyl, isoquinolinyl, pyridazinyl, cinnolinyl, phthalazinyl, pyrimidinyl, quinazolinyl, pyrazinyl and quinoxalinyl.

The expression "heteroarylene" represents any divalent radical of a monocyclic or bicyclic 5 to 10 membered aromatic group comprising from 1 to 3 heteroatoms independently selected from oxygen, nitrogen and sulfur. Examples of $C_5$-$C_{10}$ heteroarylene groups include furylene, thienylene, pyrrolylene, pyrazoylene, imidazolylene, isoxazolylene, isothiazoylene, thiazolylene, oxazolylene, 1,2,3-triazolylene, 1,2,4-triazolylene, 1-benzofurylene, 1-benzothienylene, indolylene, benzimidazolylene, indazolylene, 1,2-benzisoxazolylene, 2,1-benzisoxazolylene, 1,2-benzisothiazolylene, 2,1-benzisothiazolylene, benzothiazolylene, benzoxazolylene, benzotriazolylene, pyridylene, quinolinylene, isoquinolinylene, pyridazinylene, cinnolinylene, phthalazinylene, pyrimidinylene, quinazolinylene, pyrazinylene and quinoxalinylene.

The expression "substituted heteroaryl" represents any heteroaryl group as defined above substituted by one or more substituents selected from alkyl, alkoxy, alkoxycarbonyl, alkanoyl, aroyl, formyl, nitrile, nitro, amido, alkylthio, alkylsulfinyl, alkylsulfonyl, arylthio, arylsulfinyl, arylsulfonyl, amino, alkylamino, arylamino, dialkylamino and diarylamino. Preferably, the substituents are selected from bulky or electron withdrawing groups. Examples of substituted $C_5$-$C_{10}$ heteroaryl groups include 4-methylthienyl, 5-methyl-2-thienyl, 6-methyl-2-pyridyl, N-methylpyrrol-2-yl and N-phenylindol-3-yl.

The expression "haloalkyl" represents any $C_1$-$C_{12}$ alkyl group substituted by one or more halogen atom such as F or Cl. Examples of $C_1$-$C_{12}$ haloalkyl groups include $C_1$-$C_{12}$ perhaloalkyl groups, in particular $C_1$-$C_4$ perhaloalkyl groups such as —$CF_3$, as well as $C_1$-$C_{12}$ (perhaloalkyl)alkyl groups, in particular ($C_1$-$C_4$ perhaloalkyl)-($C_1$-$C_4$ alkyl) groups such as —$CH_2CF_3$.

The expression "haloalkoxy" represents a radical of formula —OR wherein R is a $C_1$-$C_{12}$ haloalkyl. Examples of $C_1$-$C_{12}$ haloalkoxy include $C_1$-$C_{12}$ perhaloalkoxy groups, in particular $C_1$-$C_4$ perhaloalkoxy groups such as —$OCF_3$, as well as $C_1$-$C_{12}$ (perhaloalkyl)alkoxy groups, in particular ($C_1$-$C_4$ perhaloalkyl)-($C_1$-$C_4$ alkoxy) groups such as —$OCH_2CF_3$.

The expression "alkylthio" represents a radical of formula —SR wherein R is a $C_1$-$C_{12}$ alkyl. Examples of $C_1$-$C_{12}$ alkylthio groups include —$SCH_3$ and —$SCH_2CH_3$.

The expression "haloalkylthio" represents a radical of formula —SR wherein R is a $C_1$-$C_{12}$ haloalkyl. Examples of $C_1$-$C_{12}$ haloalkyl groups include $C_1$-$C_{12}$ perhaloalkylthio groups, in particular $C_1$-$C_4$ perhaloalkylthio groups such as —$SCF_3$, as well as $C_1$-$C_{12}$ (perhaloalkyl)alkylthio groups, in particular ($C_1$-$C_4$ perhaloalkyl)-($C_1$-$C_4$ alkylthio) groups such as —$SCH_2CF_3$.

The expression "hydroxyalkyl" represents any $C_1$-$C_{12}$ alkyl group substituted by one or more hydroxyl groups. Examples of $C_1$-$C_{12}$ hydroxyalkyl groups include —$CH_2OH$ and —$CH_2CH_2OH$.

The expression "acyloxy" represents a radical of formula —OC(O)R wherein R is a $C_1$-$C_{12}$ alkyl. Examples of $C_1$-$C_{12}$ acyloxy groups include —$OC(O)CH_3$ and —$OC(O)CH_2CH_3$.

The expression "polyalkylenoxy" represents a radical of formula —O(R'O)$_m$R wherein R' is a $C_1$-$C_{12}$ alkylene, R is a $C_1$-$C_{12}$ alkyl and m is an integer from 1 to 12. Examples of poly($C_1$-$C_{12}$ alkylenoxy) groups include $OCH_2CH_2OCH_3$.

The expression "alkoxycarbonyl" represent a radical of formula —C(O)OR wherein R is a $C_1$-$C_{18}$ alkyl. Examples of $C_1$-$C_{18}$ alkoxycarbonyl groups include $C_1$-$C_4$ alkoxycarbonyl groups such as —$C(O)OCH_3$ and —$C(O)OC_2H_5$.

In formula (II), Z called "the central core" is preferably selected from $C_1$-$C_{12}$ alkylene, $C_3$-$C_7$ cycloalkylene, $C_3$-$C_{14}$ arylene, $C_5$-$C_{10}$ heteroarylene, ($C_1$-$C_4$ alkylene)-($C_3$-$C_{14}$ arylene), ($C_1$-$C_4$ alkylene)-($C_3$-$C_{14}$ heteroarylene), ($C_1$-$C_4$ alkylene)-($C_3$-$C_{14}$ arylene)-($C_1$-$C_4$ alkylene), ($C_1$-$C_4$ alkylene)-($C_3$-$C_{14}$ heteroarylene)-($C_1$-$C_4$ alkylene), ($C_3$-$C_{14}$ arylene)-($C_3$-$C_{14}$ arylene), ($C_1$-$C_4$ alkylene)-($C_3$-$C_{14}$ arylene)-($C_3$-$C_{14}$ arylene)-($C_1$-$C_4$ alkylene) and ($C_3$-$C_{14}$ arylene)-(CR'R")—($C_3$-$C_{14}$ arylene) wherein R' and R" form together with the carbon to which they are linked a $C_3$-$C_{20}$ carbocyclic group; wherein the arylene and cycloalkylene groups may be substituted by one or more substituents selected from halogen, $C_1$-$C_4$ alkyl, $C_1$-$C_4$ alkoxy and $C_3$-$C_7$ cycloalkyl and the alkylene groups may be substituted by one or more substituents selected from halogen, $C_3$-$C_{14}$ alkyl, $C_1$-$C_{12}$ alkoxy, $C_2$-$C_{12}$ acyloxy, $C_1$-$C_{12}$ hydroxyalkyl, $C_3$-$C_{12}$ cycloalkyl, phenyl, phenyloxy and substituted phenyl. In particular, substituted alkylene include —$CH_2$(CR$^a$R$^b$)$CH_2$— wherein R$^a$ and R$^b$ may be independently selected from H, $C_3$-$C_{14}$ alkyl, $C_3$-$C_{12}$ cycloalkyl, (cycloalkyl)methyl, aryl, substituted aryl, arylalkyl such as benzyl or phenyl($C_2$-$C_7$ alkyl), phenyloxyethyl, substituted arylalkyl, $C_1$-$C_{12}$ alkoxy, $C_2$-$C_{12}$ acyloxy, $C_1$-$C_{12}$ hydroxyalkyl, and $C_1$-$C_{12}$ alkoxymethyl.

More preferably, Z is selected from $C_1$-$C_{12}$ alkylene, aryl substituted $C_1$-$C_{12}$ alkylene, phenylene, naphthylene, ($C_1$-$C_4$ alkylene)-phenylene-($C_1$-$C_4$ alkylene), ($C_1$-$C_4$ alkylene)-naphthylene-($C_1$-$C_4$ alkylene) such as naphthylene bis(methylene), quinoxaline-2,3-diyl, ($C_1$-$C_4$ alkylene)-quinoxaline-2,3-diyl-($C_1$-$C_4$ alkylene) such as quinoxaline-2,3-diylbis(methylene), phenylene-phenylene, ($C_1$-$C_4$ alkylene)-phenylene-phenylene-($C_1$-$C_4$ alkylene) and phenylene-fluorenylene-phenylene. For example, Z may be selected from —$CH_2$—, —$(CH_2)_2$—, —$(CH_2)_3$—, —$(CH_2)_4$—, —$(CH_2)_5$—, —$CH_2$—$CH(CH_3)$—$CH_2$—, —$CH_2$—$CH(CH_2Phenyl)$-$CH_2$—, —$(CH_2)_2$—$CH(CH_3)$—$CH_2$—, —$(CH_2)_3$—$CH(CH_3)$—$CH_2$—, —$(CH_2)_2$—$CH(CH_3)$—$(CH_2)_2$—,

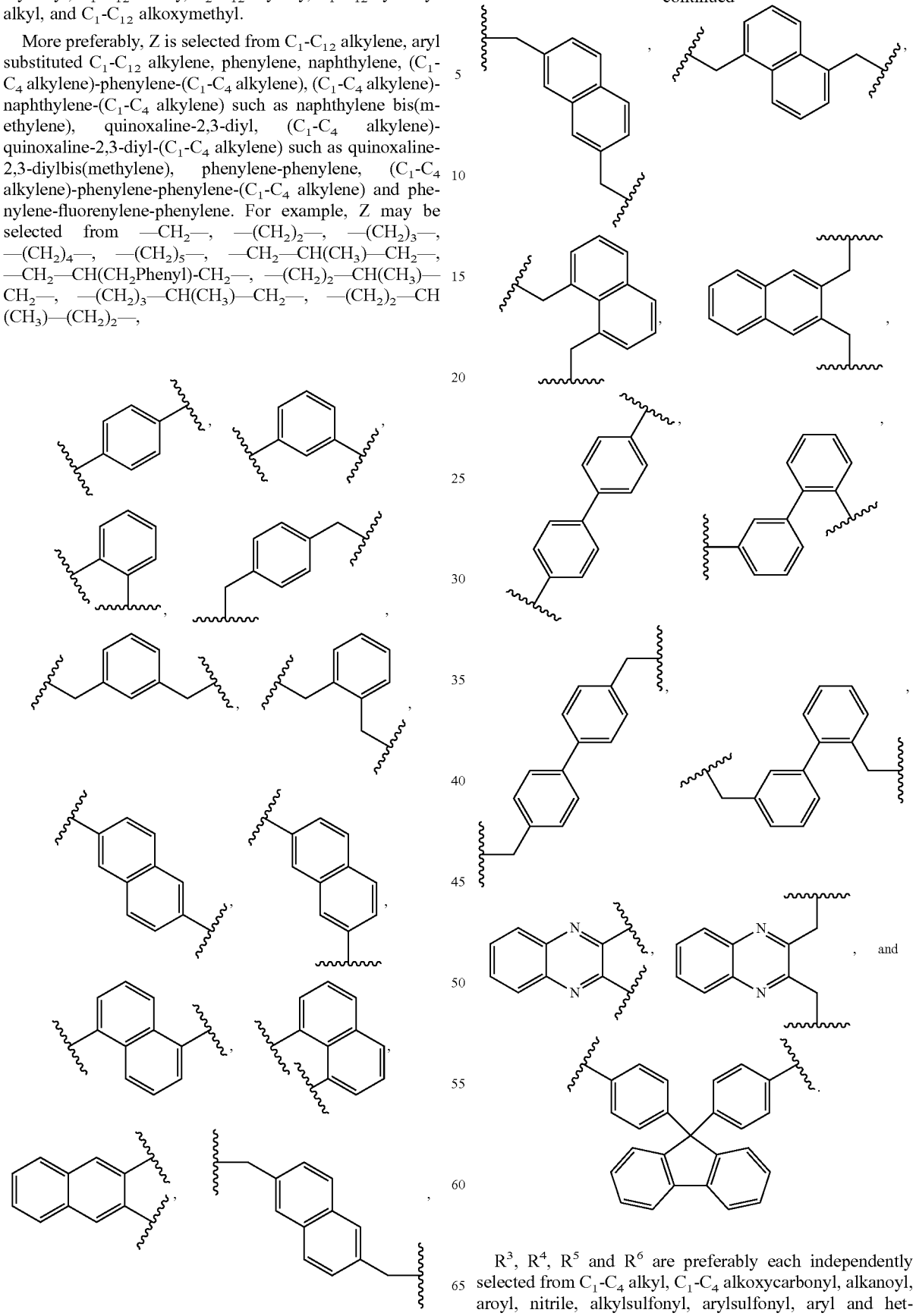

$R^3$, $R^4$, $R^5$ and $R^6$ are preferably each independently selected from $C_1$-$C_4$ alkyl, $C_1$-$C_4$ alkoxycarbonyl, alkanoyl, aroyl, nitrile, alkylsulfonyl, arylsulfonyl, aryl and heteroaryl, wherein the aryl and heteroaryl may be substituted by one or more substituents selected from $C_1$-$C_4$ alkyl and $C_1$-$C_4$ haloalkyl. Aryl, heteroaryl, substituted aryl and substituted heteroaryl are particularly preferred, and more particularly optionally substituted phenyl such as phenyl, tolyl and cumyl, because they induce a decrease of the activation potential of the compounds of the invention. Moreover, the steric hindrance provided by the presence of such substituents on the viologen cores of the compounds of the invention is believed to prevent π-π interactions between the aromatic viologen cores which is the cause of the stacking phenomenon on or near the electrode surface. For example, $R^3$, $R^4$, $R^5$ and $R^6$ may be independently selected from methyl, ethoxycarbonyl, phenyl, p-methylphenyl and p-trifluoromethylphenyl, preferably from phenyl, p-methylphenyl and p-trifluoromethylphenyl.

n, p, q and r are each independently an integer from 0 to 4, wherein when n, p, q and r are two or more, each of the $R^3$, each of the $R^4$, each of the $R^5$ or each of the $R^6$ may be identical or different. Preferably, n and r are 0 when at least one of p and q is an integer from 1 to 4, and conversely p and q are 0 when at least one of n and r is an integer from 1 to 4. In a preferred embodiment, n and r are 0 and p and q are 2. In such an embodiment the two $R^3$ substituents, respectfully the two $R^4$ substituents, are identical. The two $R^3$ substituents, respectfully the two $R^4$ substituents are preferably located meta to each other and are all ortho position relative to the central core Z. Moreover, the $R^3$ substituents may be similar or different from the $R^4$ substituents. In another embodiment, n, p, q and r are 0.

The counterion $X^-$ may be any anion that maintains electric neutrality of the viologen compounds of formula (I) or (II). $X^-$ is preferably selected from halide, preferably fluoride and chloride, tetrafluoroborate, tetraphenylborate, hexafluorophosphate, nitrate, methanesulfonate, trifluoromethane sulfonate, toluene sulfonate, hexachloroantimonate, bis(trifluoromethanesulfonyl)imide, perchlorate, acetate, sulphate and their mixtures.

In formula (I), $R^1$ and $R^2$ are independently selected from optionally substituted phenyl groups. The inventors have observed that the presence of phenyl groups results in the stabilization of the compounds of the invention and, consequently, in a decrease of the activation potential, which corresponds to an increase of the reduction potential, of the viologen compounds. Optionally substituted phenyl groups are represented by formula (V):

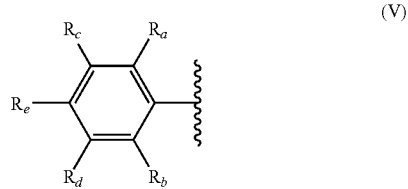

(V)

wherein $R_a$, $R_b$, $R_c$, $R_d$ and $R_e$ are each independently selected from:

H, halogen, cyano, nitro, alkyl, haloalkyl, haloalkoxy, (haloalkoxy)alkyl, arylalkyl, cycloalkyl, (cycloalkyl)alkyl and (heterocycloalkyl)alkyl, alkenyl, alkynyl, allyl, vinyl, aryl, substituted aryl, heteroaryl, substituted heteroaryl, —N(aryl)$_2$, —N(aryl)CO(aryl), —CO-aryl and —CO-substituted aryl;
—OR$^{19}$, —SR$^{19}$, —S(O)R$^{19}$, —S(O$_2$)R$^{19}$, —S(O$_2$)NR$^{19}$R$^{20}$, —NR$^{19}$R$^{20}$, —NR$^{19}$COR$^{20}$, —NR$^{19}$CO(aryl), —NR$^{19}$aryl, —CH$_2$OR$^{19}$, —CH$_2$SR$^{19}$, —CH$_2$R$^{19}$, —CO—R$^{19}$ and —CO$_2$R$^{20}$ wherein R$^{19}$ and R$^{20}$ are independently selected from H, alkyl, haloalkyl, arylalkyl, cycloalkyl, cycloalkylalkyl and heterocycloalkylalkyl;
—S(O$_2$)NR$^{21}$R$^{22}$ and —NR$^{21}$R$^{22}$, wherein R$^{21}$ and R$^{22}$ form together with the nitrogen atom to which they are linked a saturated 5 to 7 membered heterocycloalkyl which may comprising in addition to the nitrogen atom one further heteroatom selected from oxygen, nitrogen and sulfur, and which may be optionally substituted by one or two groups, identical or different, selected from halogen, —R$^{19}$, —OR$^{19}$, and —NR$^{19}$R$^{20}$, wherein R$^{19}$ and R$^{20}$ are as defined above;
—V—W—R$^{23}$ wherein:
  V is selected from oxygen, —N(R$^{19}$)—, sulfur, —S(O)— and —S(O$_2$)— wherein R$^{19}$ is as defined above;
  W is alkylene, which may be substituted by a group selected from halogen and alkoxy; and
  R$^{23}$ is selected from —OR$^{19}$, —NR$^{19}$ (alkyl) and —SR$^{19}$ wherein R$^{19}$ is as defined above; and
—OC(O)—R$^{24}$ wherein R$^{24}$ is selected from alkyl, haloalkyl, alkenyl, —W—R$^{23}$, and aryl group which may be substituted by 1 to 4 groups selected from halogen, —R$^{19}$, —OR$^{19}$, —SR$^{19}$, —NR$^{19}$R$^{20}$, —NR$^{21}$R$^{22}$, —CO—R$^{19}$, —CO$_2$R$^{19}$ wherein R$^{19}$, R$^{20}$, R$^{21}$, R$^{22}$, R$^{23}$ and W are as defined above.

In particular, $R_a$, $R_b$, $R_c$, $R_d$ and $R_e$ may be independently selected from H, halogen, cyano, nitro, hydroxyl, alkyl, preferably $C_4$-$C_{12}$ alkyl, haloalkyl, alkoxy, haloalkoxy, alkylthio, acyl, aroyl, alkoxycarbonyl, cycloalkyl, allyl, aryl, benzyl, and heteroaryl. In a particular embodiment, at least one of $R_a$, $R_b$, $R_c$, $R_d$ and $R_e$ is not H. Preferably, at least one of $R_a$, $R_b$, $R_c$, $R_d$ and $R_e$ is selected from halogen, cyano, nitro, hydroxyl, haloalkyl, haloalkoxy, alkoxycarbonyl, allyl, aryl and heteroaryl. Indeed, the inventors have found that such electron-withdrawing substituents stabilize the radical cation which results in a decrease of the activation potential. In a preferred embodiment, $R_e$ is H and at least one of $R_a$, $R_b$, $R_c$ and $R_d$ is not H, preferably at least one of $R_a$ and $R_b$ is not H.

In a preferred variant, and in particular in the case where $R_1$ and $R_2$ are chosen to be different, $R_e$ is H and at least one of $R_a$, $R_b$, $R_c$ and $R_d$ is not H, and may be independently selected from halogen, cyano, nitro, hydroxyl, $C_4$-$C_{12}$ alkyl, haloalkyl, alkoxy, haloalkoxy, alkoxycarbonyl, cycloalkyl, allyl, aryl and heteroaryl.

In another variant, then $R_e$ is H and at least one of $R_a$, $R_b$, $R_c$ and $R_d$ is not H, and may be independently selected from halogen, cyano, hydroxyl, $C_4$-$C_{12}$ alkyl, haloalkyl, alkoxy, haloalkoxy, alkoxycarbonyl, cycloalkyl, allyl, and heteroaryl.

For example, at least one of $R_a$, $R_b$, $R_c$, $R_d$ and $R_e$ may be selected from methyl, i-propyl, t-butyl, cyano, trifluoromethoxy, preferably trifluoromethoxy. Thus, $R^1$ and $R^2$ may be independently selected from:

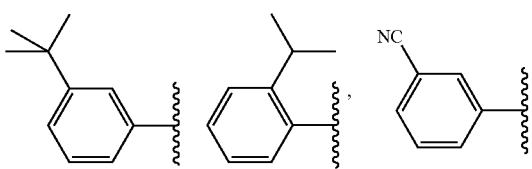

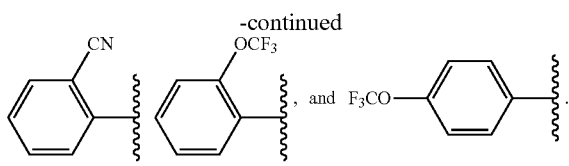

In a preferred embodiment, $R^1$ and $R^2$ are independently selected from substituted phenyl groups of formula (VI):

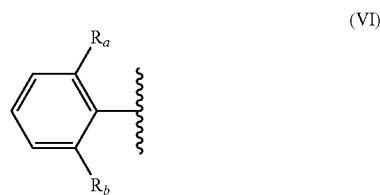

wherein $R_a$ and $R_b$ are as defined above provided that at least one of $R_a$ and $R_b$ is not H. In particular, $R^1$ and $R^2$ may be selected from:

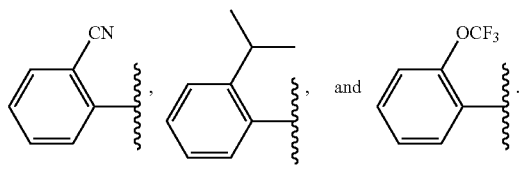

In formula (II), A and B are preferably respectively selected from nitrogen and —N$^+$(R$^{7a}$)—, and from nitrogen and —N$^+$(R$^{7b}$)—, wherein R$^{7a}$ and R$^{7b}$ are independently selected from $C_6$-$C_8$ alkyl, in particular n-hexyl, and phenyl or naphthyl, wherein phenyl and naphthyl may be both substituted by one or more substituents independently selected from halogen, cyano, nitro, hydroxy, $C_1$-$C_4$ alkyl, $C_1$-$C_4$ haloalkyl, $C_1$-$C_4$ alkoxy, $C_1$-$C_4$ haloalkoxy, $C_1$-$C_4$ alkylthio, $C_1$-$C_4$ haloalkylthio, $C_3$-$C_7$ cycloalkyl, ($C_3$-$C_7$ cycloalkyl) $C_1$-$C_4$ alkyl.

In particular, A and B may be independently selected from —N$^+$($C_6$-$C_8$ alkyl)-, preferably —N$^+$($C_6H_{13}$)—, more preferably —N$^+$(n-$C_6H_{13}$)—. The corresponding compounds have a good solubility in conventional solvents used in electrochromic compositions, such as propylene carbonate, while maintaining a fast fading rate to the bleached state. Indeed, $C_1$-$C_5$ alkyl substituted viologen compounds are more difficult to solubilise in some solvents used in electrochromic compositions like some ionic liquids. On the contrary, higher alkyl substituted two-core viologen compounds have good solubility. However, when two-core viologen compounds are substituted with long chain alkyls having more than 8 carbon atoms, the fading rate tends to decrease, which prevents a fast reversibility to the bleached state.

Also, the inventors have observed that the presence of aryl substituents, in particular phenyl substituents, on the viologen cores of compounds of the present invention results in the stabilization of the compounds of the invention and, consequently, in a decrease of the activation potential, which corresponds to an increase in the reduction potential of the viologen compounds. Therefore, in a preferred embodiment, A and B may be respectively selected from nitrogen and —N$^+$(R$^{7a}$)—, and from nitrogen and —N$^+$(R$^{7b}$)—, wherein R$^{7a}$ and R$^{7b}$ are independently selected from optionally substituted phenyl groups represented by formula (V) as defined above, preferably represented by formula (VI) as defined above.

In a particularly preferred embodiment, the viologen derivatives of formula (I) and (II) are selected from the group consisting of:

| Compound | Formula |
|---|---|
| I-1 | |
| I-2 | |
| I-3 | |
| I-4 | |

-continued
| Compound | Formula |
|---|---|
| I-5 | 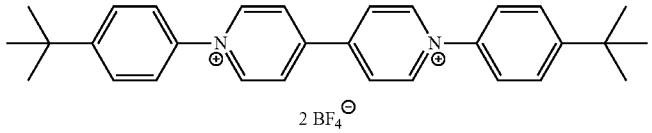<br>2 BF$_4^\ominus$ |
| I-6 | 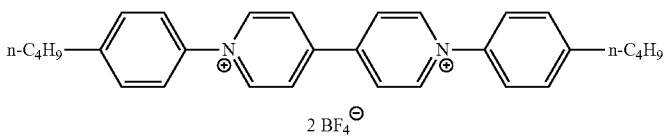<br>2 BF$_4^\ominus$ |
| I-7 | 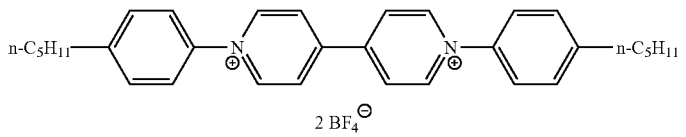<br>2 BF$_4^\ominus$ |
| I-8 | 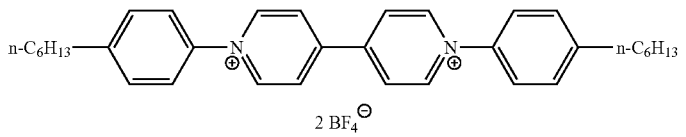<br>2 BF$_4^\ominus$ |
| I-9 | 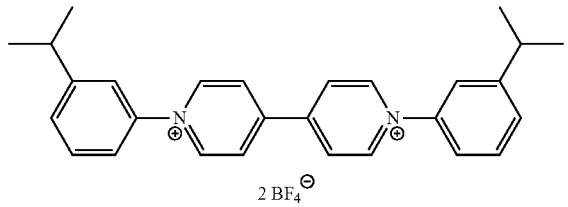 [SMILES: CC(C)c1cccc(-[n+]2ccc(-c3cc[n+](-c4cccc(C(C)C)c4)cc3)cc2)c1]<br>2 BF$_4^\ominus$ |
| I-10 | 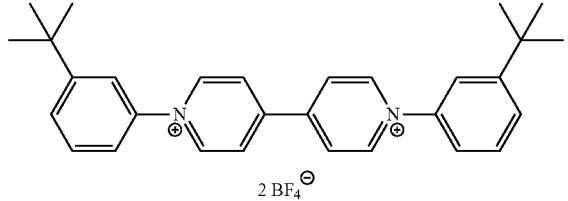 [SMILES: CC(C)(C)c1cccc(-[n+]2ccc(-c3cc[n+](-c4cccc(C(C)(C)C)c4)cc3)cc2)c1]<br>2 BF$_4^\ominus$ |
| I-11 | 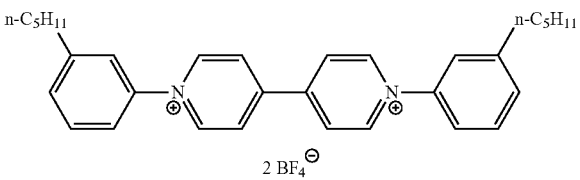<br>2 BF$_4^\ominus$ |
| I-12 | 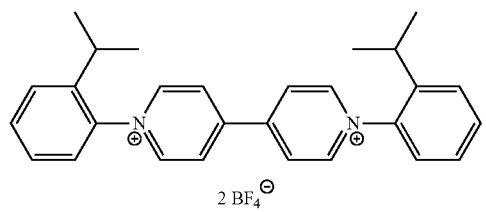<br>2 BF$_4^\ominus$ |

-continued
| Compound | Formula |
|---|---|
| I-13 | 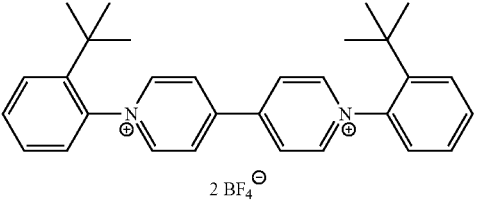 [SMILES: CC(C)(C)c1ccccc1-[n+]1ccc(-c2cc[n+](-c3ccccc3C(C)(C)C)cc2)cc1]<br>2 BF₄⁻ |
| I-14 | 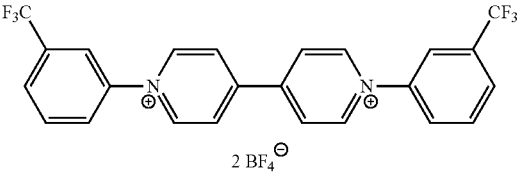<br>2 BF₄⁻ |
| I-15 | 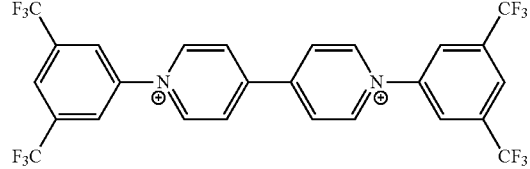<br>2 BF₄⁻ |
| I-16 | 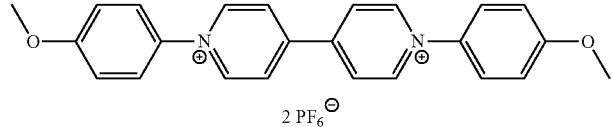<br>2 PF₆⁻ |
| I-17 | 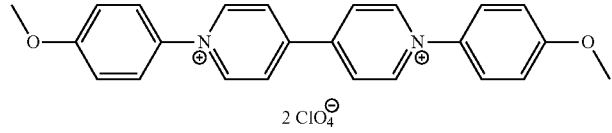<br>2 ClO₄⁻ |
| I-18 | 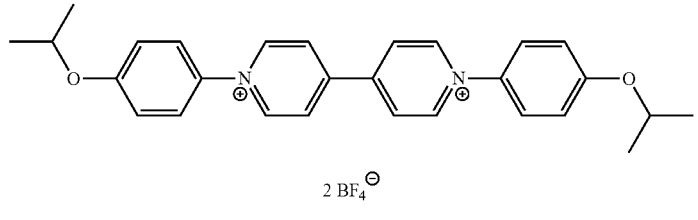 [SMILES: CC(C)Oc1ccc(-[n+]2ccc(-c3cc[n+](-c4ccc(OC(C)C)cc4)cc3)cc2)cc1]<br>2 BF₄⁻ |
| I-19 | 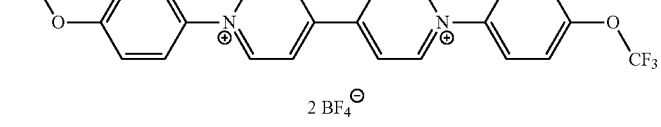<br>2 BF₄⁻ |
| I-20 | 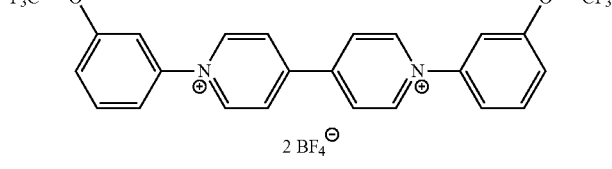<br>2 BF₄⁻ |

| Compound | Formula |
|---|---|
| I-21 | [structure: 2-(trifluoromethoxy)phenyl groups on N,N'-bipyridinium, 2 BF$_4^\ominus$] |
| I-22 | [structure: 4-(trifluoromethoxy)phenyl and 2-(trifluoromethoxy)phenyl on N,N'-bipyridinium, 2 BF$_4^\ominus$] |
| I-23 | [structure: 4-cyanophenyl groups on N,N'-bipyridinium, 2 BF$_4^\ominus$] |
| I-24 | [structure: 3-cyanophenyl groups on N,N'-bipyridinium, 2 BF$_4^\ominus$] |
| I-25 | [structure: 4-(2-hydroxyethyl)phenyl groups on N,N'-bipyridinium, 2 BF$_4^\ominus$] |
| I-26 | [structure: 4-(ethoxycarbonyl)phenyl groups on N,N'-bipyridinium, 2 BF$_4^\ominus$] |
| I-27 | [structure: 3-(ethoxycarbonyl)phenyl groups on N,N'-bipyridinium, 2 BF$_4^\ominus$] |
| I-28 | [structure: 4-(ethoxycarbonylmethyl)phenyl groups on N,N'-bipyridinium, 2 BF$_4^\ominus$] |

-continued
| Compound | Formula |
|---|---|
| I-29 | 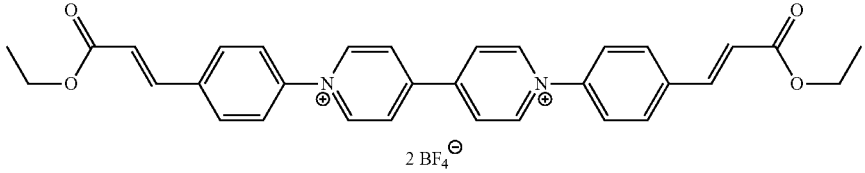<br>2 BF$_4^\ominus$ |
| I-30 | 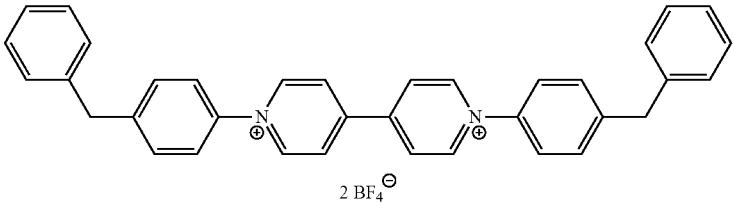 [SMILES: c1ccc(Cc2ccc(-[n+]3ccc(-c4cc[n+](-c5ccc(Cc6ccccc6)cc5)cc4)cc3)cc2)cc1]<br>2 BF$_4^\ominus$ |
| I-31 | 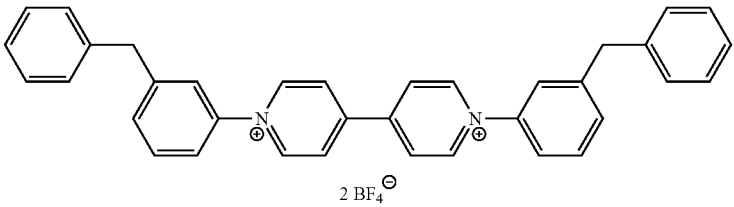<br>2 BF$_4^\ominus$ |
| I-32 | 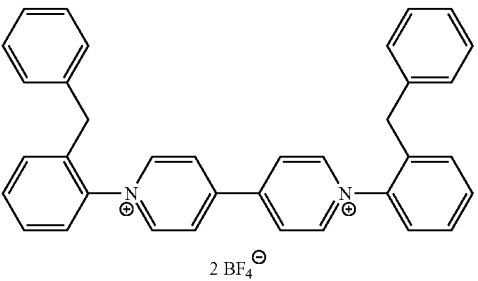 [SMILES: c1ccc(Cc2ccccc2-[n+]2ccc(-c3cc[n+](-c4ccccc4Cc4ccccc4)cc3)cc2)cc1]<br>2 BF$_4^\ominus$ |
| I-33 | 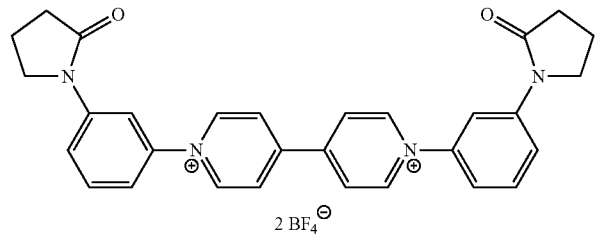 [SMILES: O=C1CCCN1c1cccc(-[n+]2ccc(-c3cc[n+](-c4cccc(N5CCCC5=O)c4)cc3)cc2)c1]<br>2 BF$_4^\ominus$ |
| I-34 | 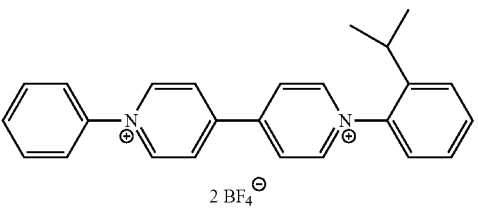<br>2 BF$_4^\ominus$ |

-continued
| Compound | Formula |
|---|---|
| I-35 | 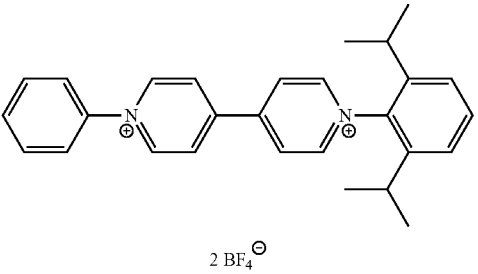 [SMILES: CC(C)c1cccc(C(C)C)c1-[n+]1ccc(-c2cc[n+](-c3ccccc3)cc2)cc1]<br>2 BF$_4^\ominus$ |
| I-36 | 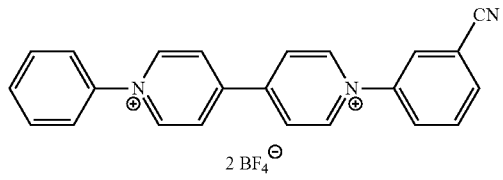 [SMILES: N#Cc1cccc(-[n+]2ccc(-c3cc[n+](-c4ccccc4)cc3)cc2)c1]<br>2 BF$_4^\ominus$ |
| I-37 | 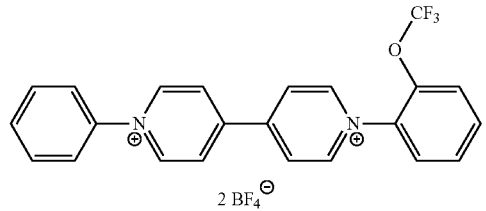<br>2 BF$_4^\ominus$ |
| I-38 | 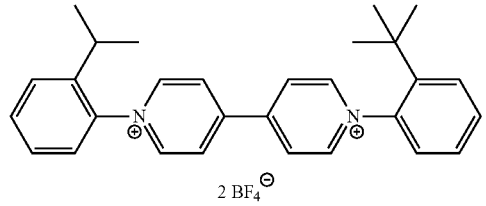<br>2 BF$_4^\ominus$ |
| I-39 | 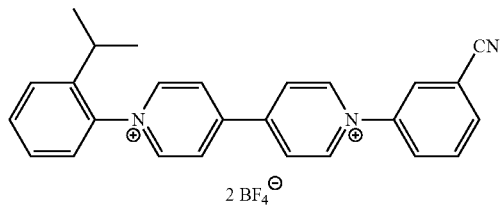<br>2 BF$_4^\ominus$ |
| I-40 | 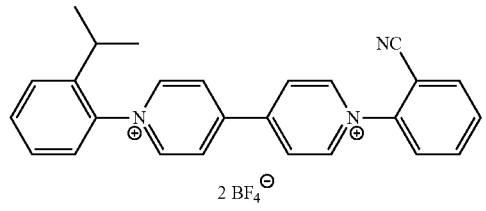 [SMILES: CC(C)c1ccccc1-[n+]1ccc(-c2cc[n+](-c3ccccc3C#N)cc2)cc1]<br>2 BF$_4^\ominus$ |
| I-41 | 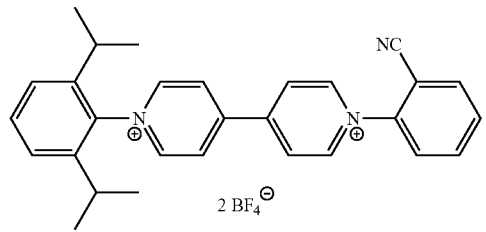 [SMILES: CC(C)c1cccc(C(C)C)c1-[n+]1ccc(-c2cc[n+](-c3ccccc3C#N)cc2)cc1]<br>2 BF$_4^\ominus$ |

-continued
| Compound | Formula |
|---|---|
| I-42 | 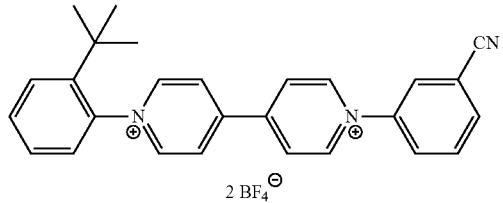<br>2 BF₄⁻ |
| I-43 | 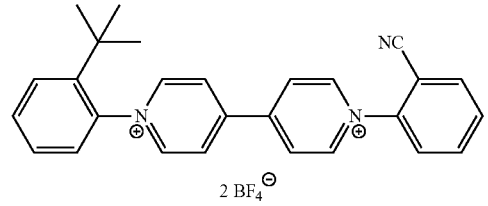 [SMILES: CC(C)(C)c1ccccc1-[n+]1ccc(-c2cc[n+](-c3ccccc3C#N)cc2)cc1]<br>2 BF₄⁻ |
| I-44 | 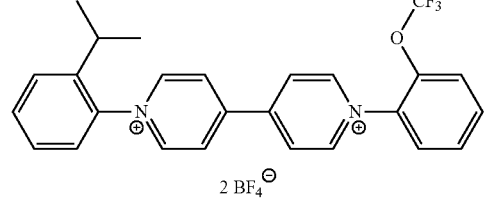<br>2 BF₄⁻ |
| I-45 | 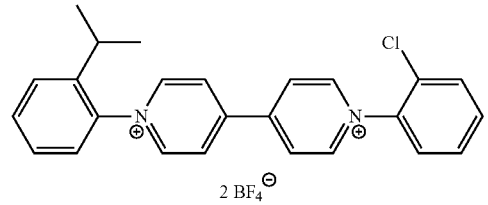<br>2 BF₄⁻ |
| I-46 | 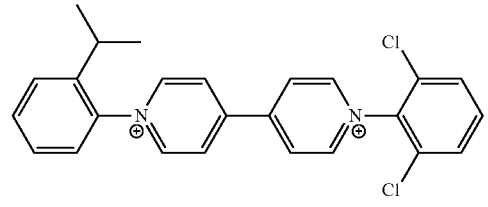<br>2 BF₄⁻ |
| I-47 | 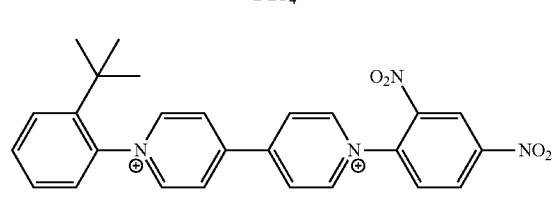<br>2 BF₄⁻ |
| I-48 | 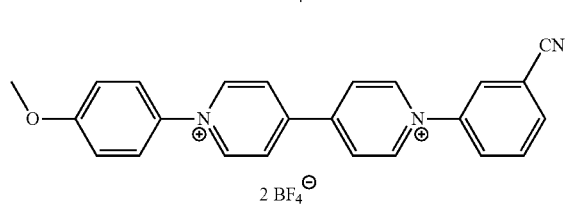<br>2 BF₄⁻ |

-continued
| Compound | Formula |
|---|---|
| I-49 | 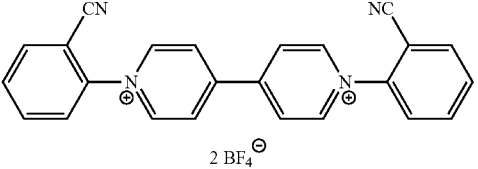 [SMILES: N#Cc1ccccc1-[n+]1ccc(-c2cc[n+](-c3ccccc3C#N)cc2)cc1] |
| I-50 | 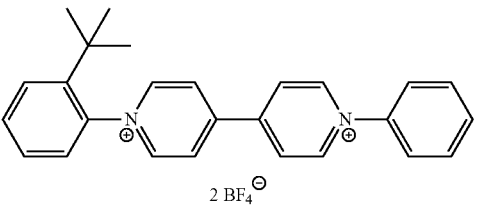 |
| III-1 | 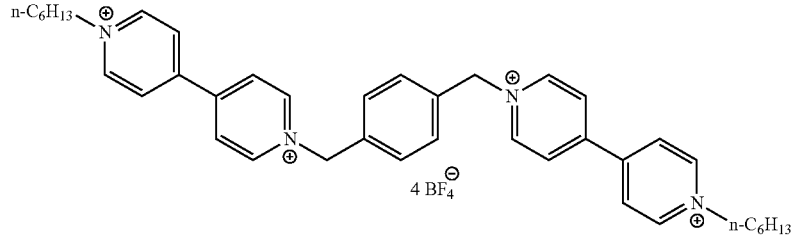 |
| III-2 | 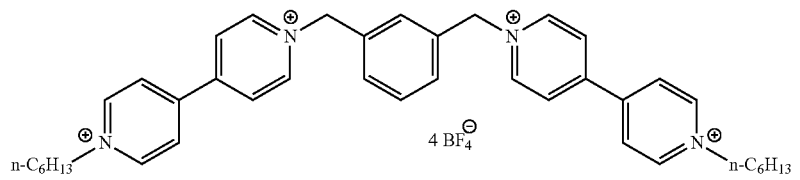 |
| III-3 | 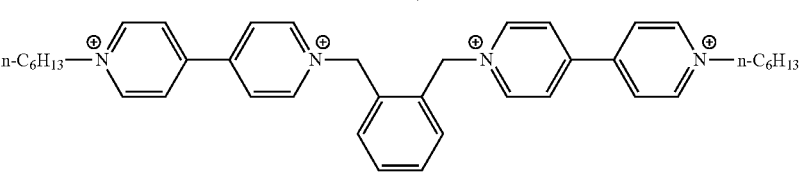 |
| III-4 | 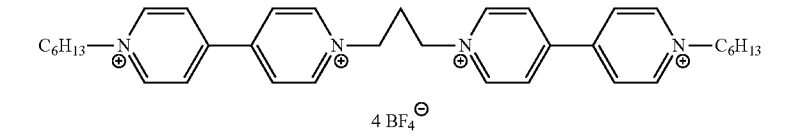 |
| III-5 | 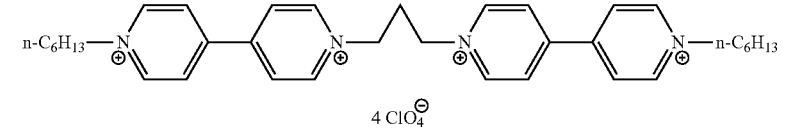 |
| III-6 | 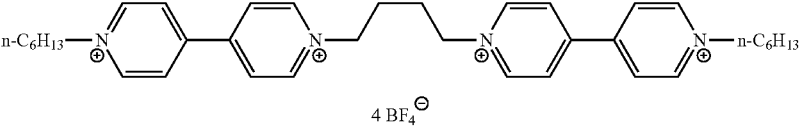 |

-continued
| Compound | Formula |
|---|---|
| III-7 | 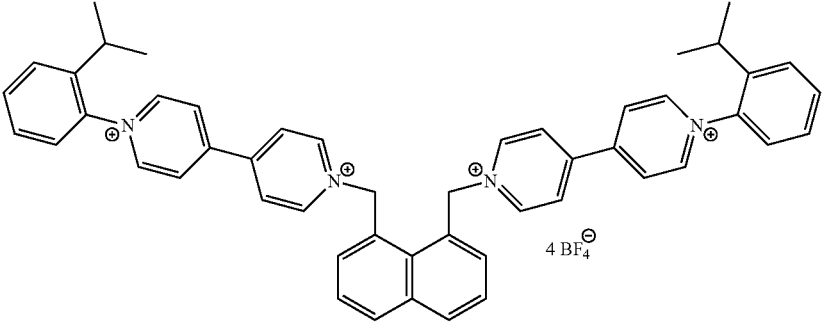 [SMILES: CC(C)c1ccccc1-[n+]1ccc(-c2cc[n+](Cc3cccc4cccc(C[n+]5ccc(-c6cc[n+](-c7ccccc7C(C)C)cc6)cc5)c34)cc2)cc1] 4 BF$_4^\ominus$ |
| III-8 | 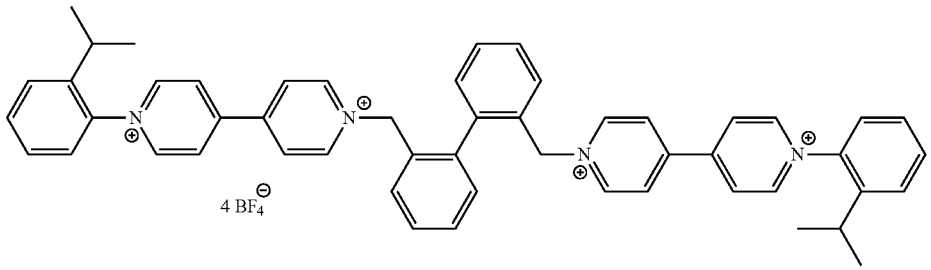 [SMILES: CC(C)c1ccccc1-[n+]1ccc(-c2cc[n+](Cc3ccccc3-c3ccccc3C[n+]3ccc(-c4cc[n+](-c5ccccc5C(C)C)cc4)cc3)cc2)cc1] 4 BF$_4^\ominus$ |
| III-9 | 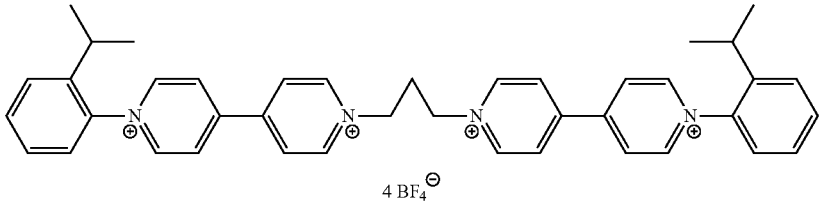 [SMILES: CC(C)c1ccccc1-[n+]1ccc(-c2cc[n+](CCC[n+]3ccc(-c4cc[n+](-c5ccccc5C(C)C)cc4)cc3)cc2)cc1] 4 BF$_4^\ominus$ |
| III-10 | 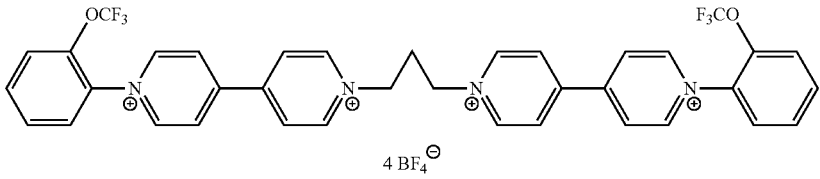 [SMILES: FC(F)(F)Oc1ccccc1-[n+]1ccc(-c2cc[n+](CCC[n+]3ccc(-c4cc[n+](-c5ccccc5OC(F)(F)F)cc4)cc3)cc2)cc1] 4 BF$_4^\ominus$ |
| III-11 | 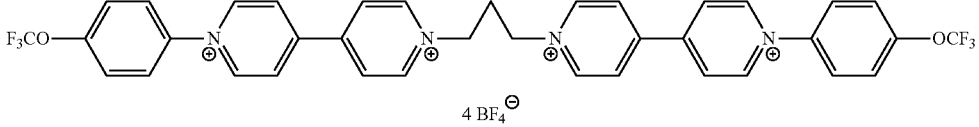 4 BF$_4^\ominus$ |
| III-12 | 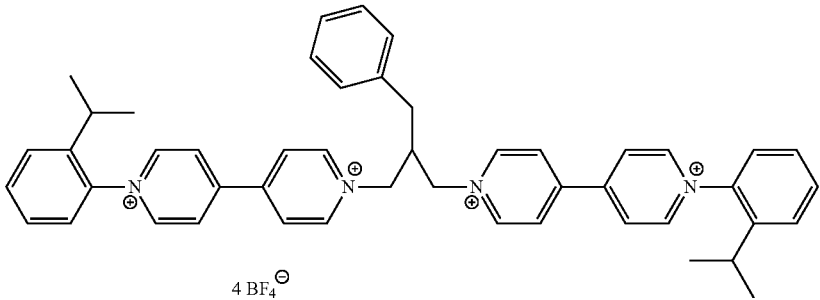 [SMILES: CC(C)c1ccccc1-[n+]1ccc(-c2cc[n+](CC(Cc3ccccc3)C[n+]3ccc(-c4cc[n+](-c5ccccc5C(C)C)cc4)cc3)cc2)cc1] 4 BF$_4^\ominus$ |

| Compound | Formula |
|---|---|
| III-13 | 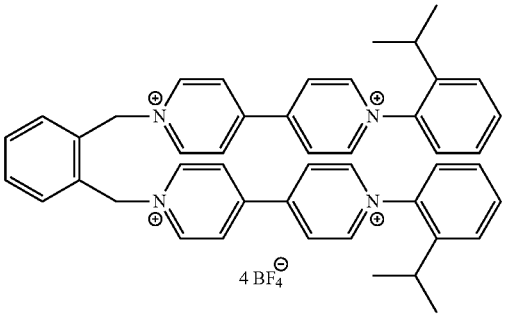 [SMILES: CC(C)c1ccccc1-[n+]1ccc(-c2cc[n+](Cc3ccccc3C[n+]3ccc(-c4cc[n+](-c5ccccc5C(C)C)cc4)cc3)cc2)cc1] |
| III-14 | 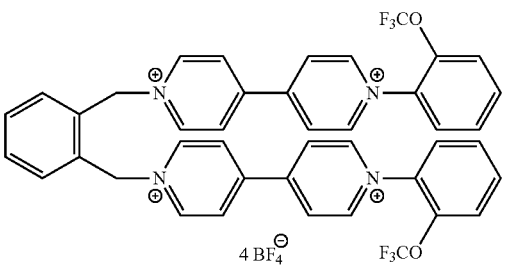 |
| III-15 | 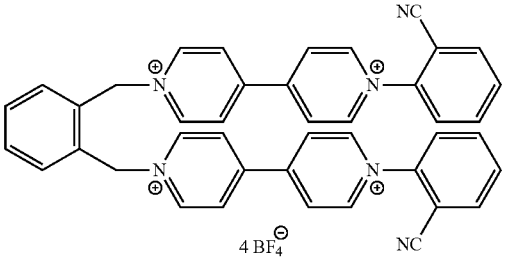 |
| III-16 | 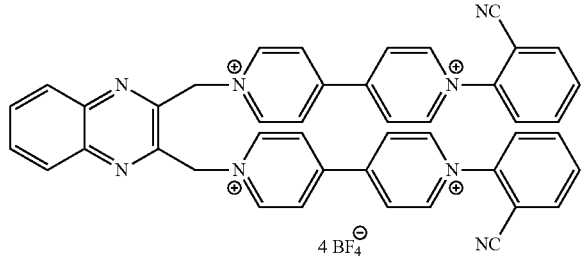 |
| III-17 | 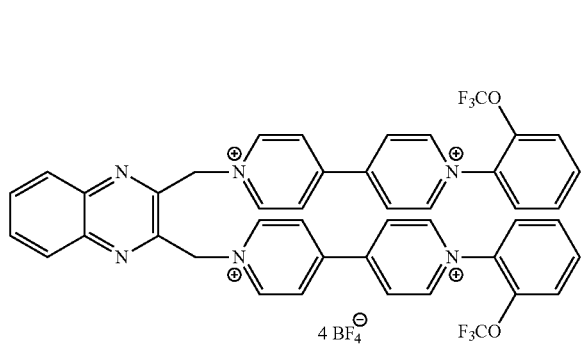 |

-continued
| Compound | Formula |
|---|---|
| III-18 | 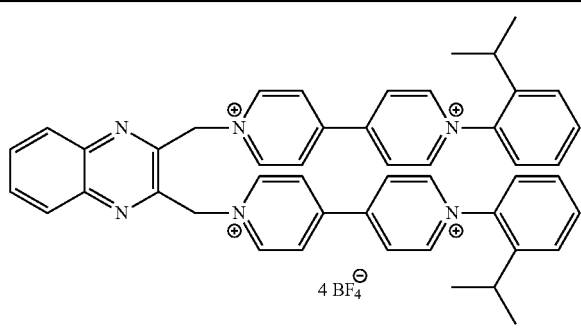 |
| III-19 | 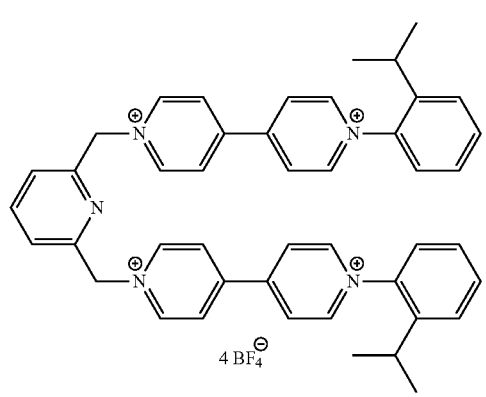 [SMILES: CC(C)c1ccccc1-[n+]1ccc(-c2cc[n+](Cc3cccc(C[n+]4ccc(-c5cc[n+](-c6ccccc6C(C)C)cc5)cc4)n3)cc2)cc1] |
| IV-1 | 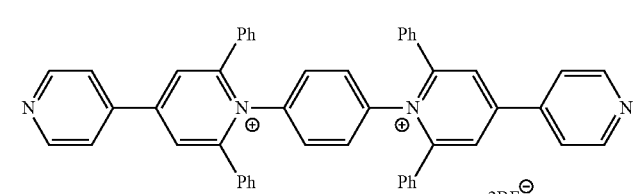 |
| IV-2 | 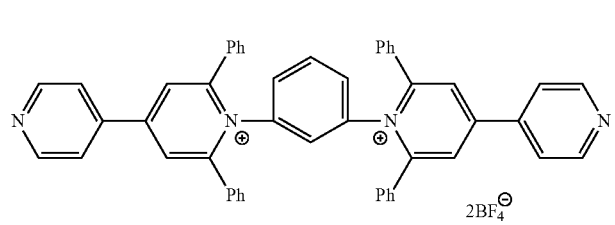 |
| IV-3 | 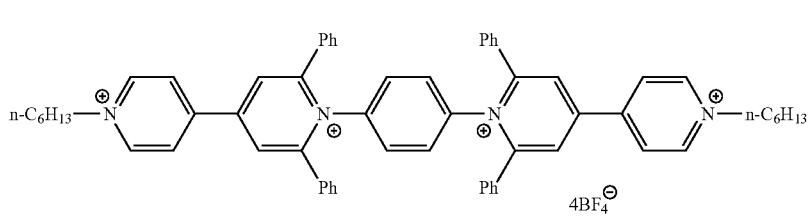 |
| IV-4 | 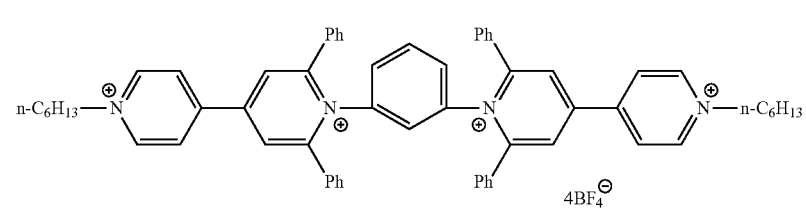 |

-continued
| Compound | Formula |
|---|---|
| IV-5 | 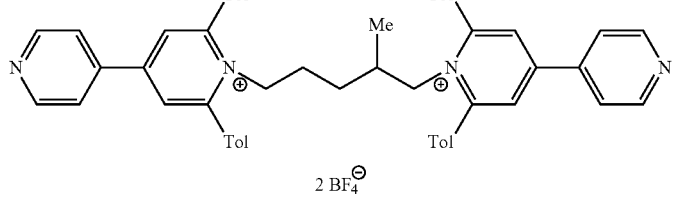 |
| IV-6 | 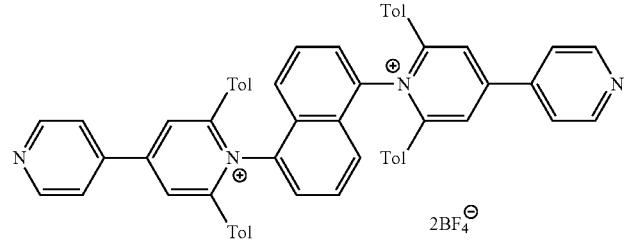 |
| IV-7 | 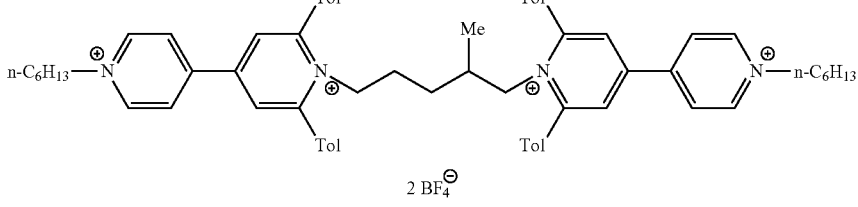 |
| IV-8 | 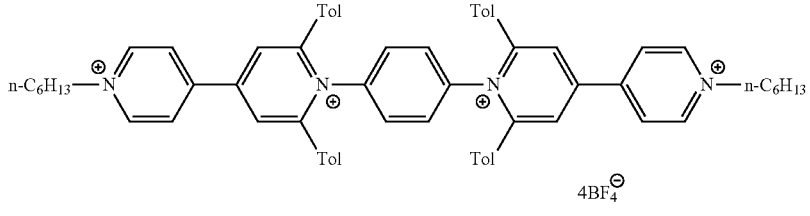 |
| IV-9 | 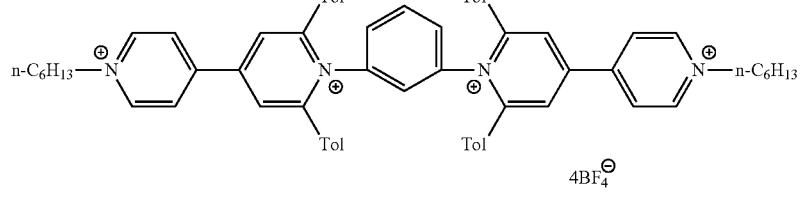 |
| IV-10 | 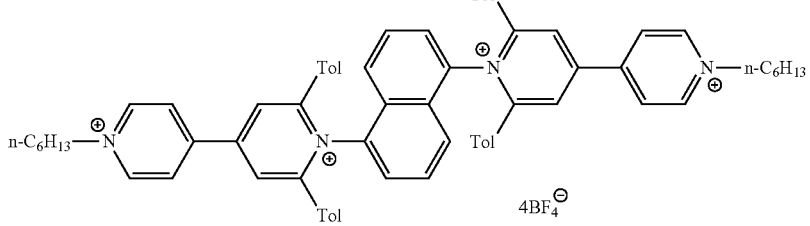 |

-continued
| Compound | Formula |
|---|---|
| IV-11 | 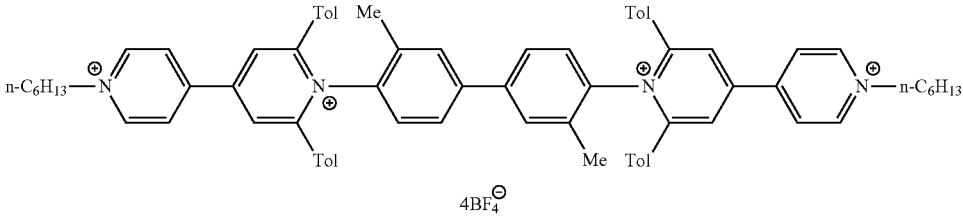 |
| IV-12 | 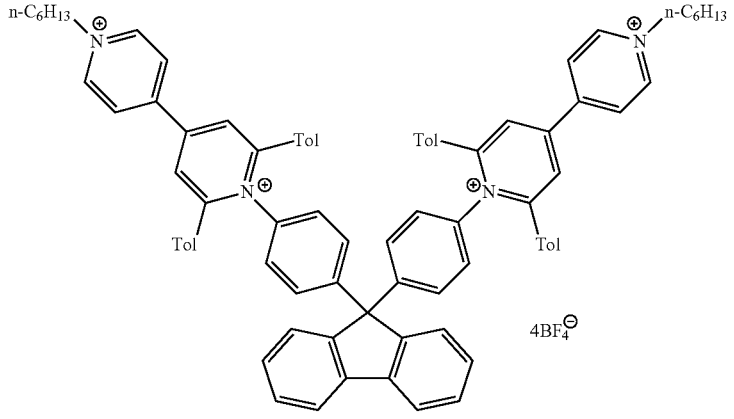 |
| IV-13 | 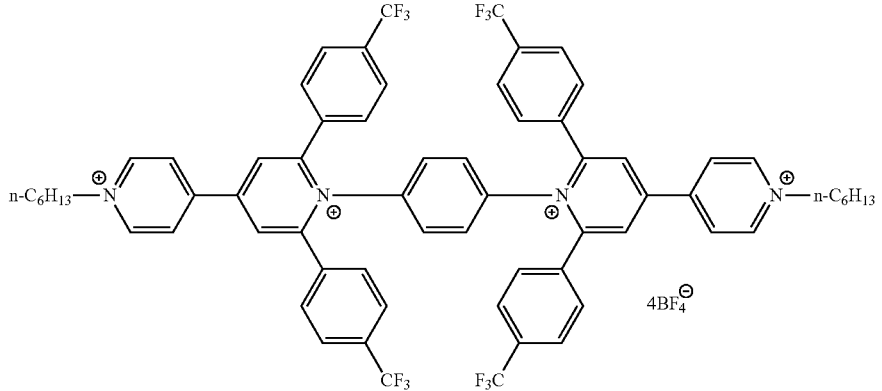 |
| IV-14 | 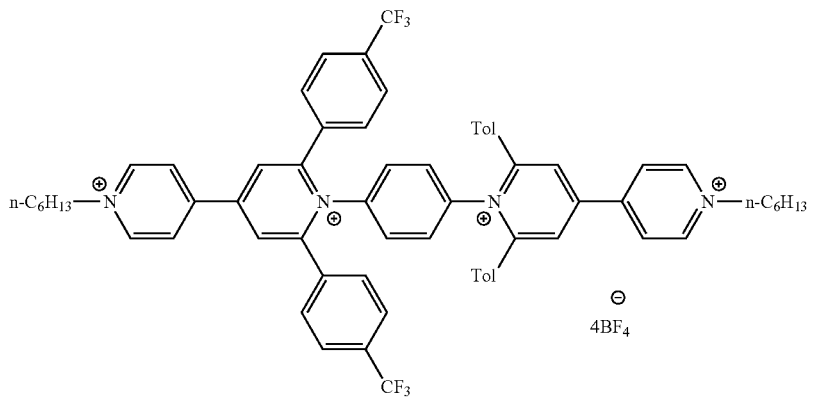 |

Me represents methyl; Ph represents phenyl; Tol represents 4-methylphenyl

In a first embodiment, at least one of the viologen derivatives present in the composition is selected from compounds of formula (I). Compounds of formula (I) generally have a green or blue-green colour in their coloured state. However, Applicant found that compounds of formula (I) wherein $R^1$ and $R^2$ are independently selected from substituted phenyl groups of formula (VI) as defined above can provide a wide range of colours in the low visible wavelength—i.e. blue or green coloured state—, while presenting good stability. Indeed, the Applicant found that the presence of a substituent in the ortho position of the phenyl group results in a hypsochromic effect compared to the meta position, which itself provides a hypsochromic effect compared to the para position. Indeed the maximum wavelength $\lambda_{max}$ in the absorption spectrum for a similar compound is higher when the substituent is in the para position of the phenyl group, than in the meta position, and a fortiori than in the ortho position.

Preferred compounds of formula (I) are compounds I-1 to I-50 defined above.

In a second embodiment, the viologen derivative of Formula (II) is selected from compounds of formula (III):

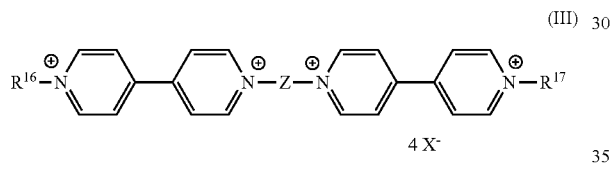

wherein Z, and $X^-$ are as defined in formula (II), and $R^{16}$ and $R^{17}$ are selected from alkyl and optionally substituted phenyl groups.

In particular, $R^{16}$ and $R^{17}$ may be independently selected from optionally substituted phenyl groups of formula (V) defined above. Alternatively, $R^{16}$ and $R^{17}$ may be independently selected from substituted phenyl groups of formula (VI) as defined above. Such compounds can provide colours in the low visible wavelength, while presenting good stability.

Preferred compounds of formula (III) are compounds III-1 to III-18 defined above.

In a third embodiment, the viologen derivative of Formula (II) is selected from compounds of formula (IV):

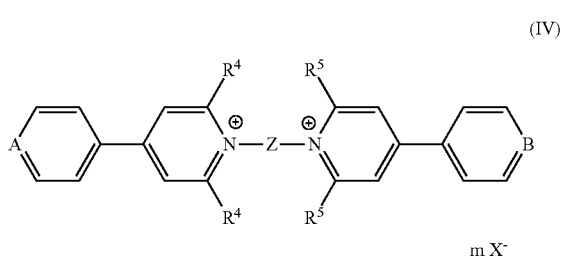

wherein $R^4$, $R^5$, Z, A, B, m and $X^-$ are as defined in formula (II) and at least one of $R^4$ and $R^5$ is not H.

Z is preferably selected from alkylene and arylene; more preferably, Z is selected from phenylene and naphthylene.

A and B are preferably independently selected from nitrogen and —N$^+$(alkyl)-. In particular, compounds of formula (IV) wherein A and B are nitrogen can provide colours in the high visible wavelength—i.e. yellow and red—, while presenting good stability.

Preferably, $R^4$ and $R^5$ are independently selected from optionally substituted aryl; more preferably, $R^4$ and $R^5$ are independently selected from optionally substituted phenyl.

Preferred compounds of formula (IV) are compounds IV-1 to IV-14 defined above.

Compounds of formula (I) and (II) can be obtained through various methods well known in the art. Suitable methods are described for example in EP 13184771.7 and EP 13184780.8.

In particular Compounds of formula IV can be prepared by a method comprising the step of reacting a 2,6-disubstituted-4-[(1H)-pyridinium-4-yl]pyrylium bis(tetrafluoroborate) (1) with a diamine (2):

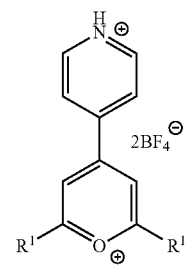

wherein Z, and $R^1$ are as defined above.

The use of a single 2,6-disubstituted-4-[(1H)-pyridinium-4-yl]pyrylium bis(tetrafluoroborate) (1) results in symmetrically substituted two-cores viologen derivatives (3) of formula (I-3) wherein A and B are nitrogen, and $R^1$ and $R^2$ are identical. Through a control the amount of the diamine (2) and a subsequent reaction with a second 2,6-disubstituted-4-[(1H)-pyridinium-4-yl]pyrylium bis(tetrafluoroborate) (1'), unsymmetrically substituted two-cores viologen derivatives (3') of formula (IV) wherein A and B are nitrogen, and $R^1$ and $R^2$ are different, can be obtained as shown on scheme A.

Scheme A

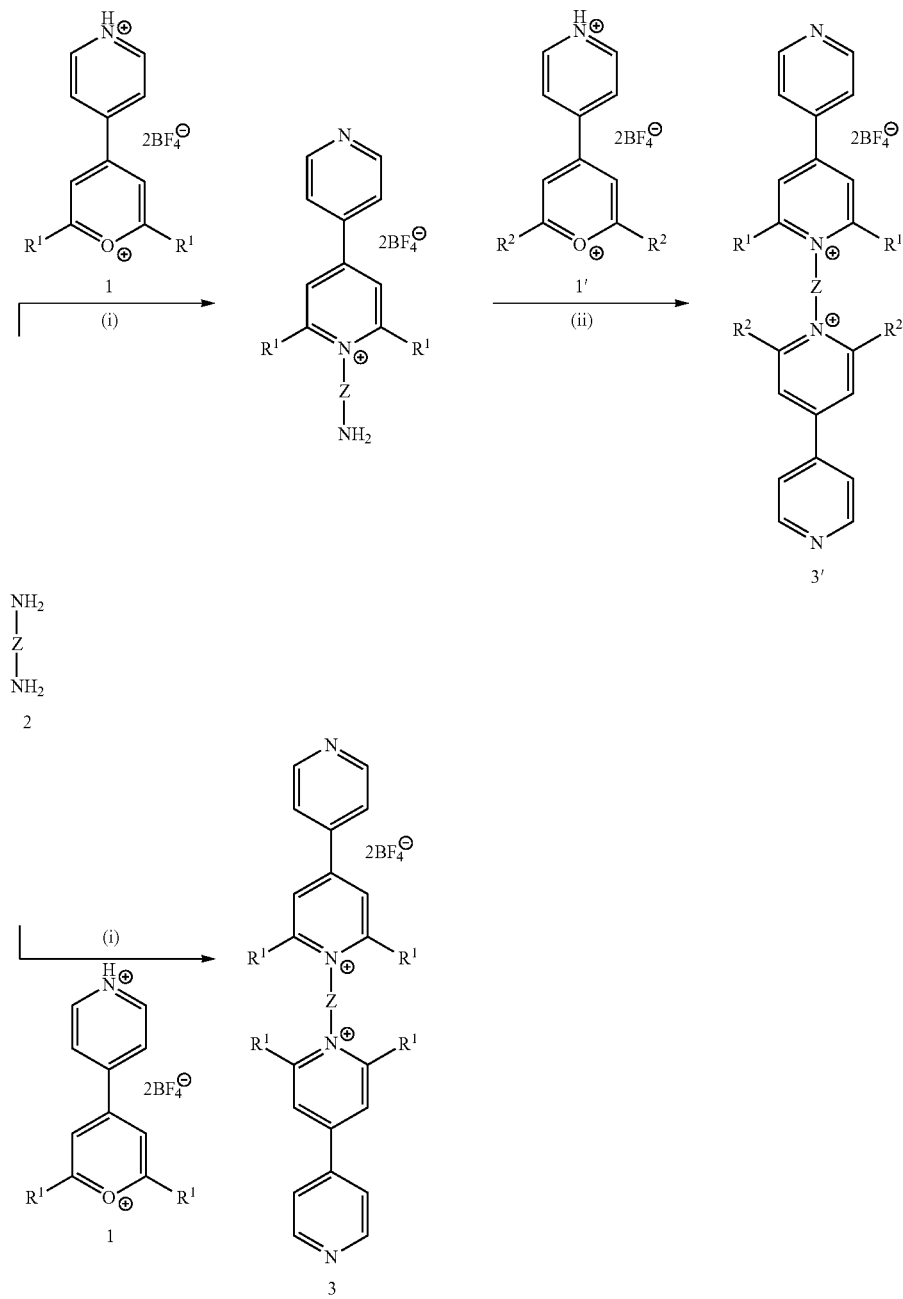

Steps (i) and (ii) disclosed in scheme A may be achieved under heat, for example from 70 to 90° C., in an alcohol and in the presence of a base.

Compounds of formula (IV) wherein A and/or B are respectively $-N^+(R^{7a})-$ and $-N^+(R^{7b})-$ as defined above can be obtained from the corresponding compounds (3) or (3') using suitable reaction step well known in the art. For example, compounds of formula (IV) wherein A and/or B are $-N^+(alkyl)-$ can be obtained through an N-alkylation of the corresponding compound (3) or (3') with a suitable haloalkane.

The 2,6-disubstituted-4-[(1H)-pyridinium-4-yl]pyrylium bis(tetrafluoroborate) (1) may be prepared according to various methods well known in the art. For example, 4-(4-pyridyl)-1,5-disubstituted-1,5-diketones can be obtained by the condensation of pyridine-4-carboxaldehyde and substituted acetophenones (see for example Aryl-substituted Derivatives of 4,4'-Bipyridylium Salts: their Spectroscopic Properties and Stereochemistry, J. E. Downes, *J. Chem. Soc.* (*C*), 1967, 1491 and Pyrylogens: Synthesis, Structural, Electrochemical, and Photophysical Characterization of a New Class of Electron Transfer Sensitizers, E. L. Clennan, C. Liao, E. Ayokosok, *J. Am. Chem. Soc.*, 2008, 130, 7552). The cyclisation of the 4-(4-pyridyl)-1,5-disubstituted 1,5-diketones can be readily accomplished by, for example, heating in glacial acetic acid containing trans-chalcone and boron trifluoride etherate to give the 2,5-disubstituted 4-[(1H)-pyridinium-4-yl]pyrylium bis(tetrafluoroborates) (1).

The reducing compound of the composition of the present invention is not particularly limited. The reducing compound is not necessarily an electrochromic compound; however, it should be chosen among compounds having at least the following properties: low absorption of visible light in the bleached state (if the reducing compound is also an electrochromic compound), good stability, in particular to oxygen, and good solubility in conventional electrochromic solvents. Whether or not the reducing compound used in the electrochromic composition of the invention has electrochromic properties, the wide range of colours available among compounds of formula (I) and (II) allows obtaining the desired colour for the electrochromic composition when activated, possibly taking into account the colour of the reducing compound in its coloured state, if any.

The reducing compound can be selected from:
ferrocene and their derivatives such as ethyl ferrocene, t-butyl ferrocene,
phenoxazine and their derivatives, such as N-benzylphenoxazine,
phenazine and their derivatives, such as 5,10-dihydrophenazine, N,N,N',N'-tetramethyl-p-phenylenediamine,
phenothiazine and their derivatives, such as 10-methylphenothiazine and isopropylphenothiazine,
thioanthrene, and
tetrathiafulvalene.

Accordingly, the reducing compound may be selected from phenothiazine derivatives of formula (VII):

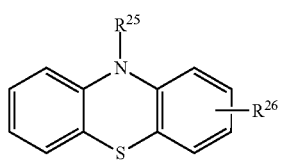

(VII)

wherein $R^{25}$ is independently selected from H, alkyl, preferably $C_1$-$C_6$ alkyl, $C_1$-$C_6$ heteroalkyl, $C_6$-$C_{14}$ aryl and substituted aryl, preferably phenyl and phenyl substituted by one or more substituents selected from halogen, $C_1$-$C_4$ alkyl, $C_1$-$C_4$ heteroalkyl and $C_1$-$C_4$ haloalkyl, and benzyl and substituted benzyl, preferably phenylbenzyl and $R^{26}$ is selected from the group consisting of H, $C_1$-$C_4$ haloalkyl, preferably trifluoromethyl, $C_1$-$C_4$ alkoxy, preferably methoxy, and optionally substituted aryl, preferably optionally substituted phenyl.

The composition of the invention also includes at least one dye, which may for instance be selected from the group consisting of:
organic or inorganic photochromic and/or dichroic substances,
electrochromic substances distinct from the first constituent of this invention, and which may be selected among the above compounds of Formulas (I) and/or (II) or among different electrochromic compounds,
organic and inorganic pigments, especially in the form of nanoparticles,
organic dyes,
optical brighteners,
and mixtures thereof.

Each dye included in the composition of the invention shall be chemically inert with respect to the electrochromic molecules with which said dye is mixed. Said dye shall also be soluble in the same solvent used for the electrochromic molecules. Moreover, said dye shall present a good electrochemical stability, i.e. each dye shall keep its characteristics after several cycles of activation/deactivation of the electrochromic molecules.

Examples of organic photochromic substances that may be used are those selected from the group consisting of: naphtopyrans, such as 3H-naphtho[2,1-b]pyrans and 3H-naphtho[1,2-b]pyrans; benzopyrans; oxazines, such as benzoxazines, spiro-oxazines, spironaphtooxazines and spiroindoline[2,3']benzoxazines; fulgides; fulgimides; and their mixtures. Among these compounds, some also provide dichroic properties, such as those described in WO 2008/028930.

Examples of dichroic substances that can be used within the context of the invention may include azomethines, indigoids, thioindigoids, indans, quinophthalonics, perylenes, phthaloperines, triphenodioxazines, indoloquinoxalines, imidazotriazines, azo and polyazo dyes, benzoquinones, naphthoquinones, (poly)anthraquinones, anthrapyrimidinones, iodines, iodates and their mixtures. These compounds are available from various suppliers such as MERCK, MITSUI or NEMATEL. Dichroic compounds are typically used in combination with liquid crystals, because the former are able to orient themselves, and the dichroic dyes they contain, when an electrical potential is applied, which produces the required colour.

The electrochromic compounds used as a dye preferably have a redox potential similar to that of the first constituent of this invention. Preferably, the redox potentials of the electrochromic compound used as a dye differ from that of the invention of less than 0.2 V, more preferably of less than 0.15 V, still more preferably of less than 0.1 V, even more preferably of less than 0.05 V. Since the redox potentials of these electrochromic compounds are very close, said compounds can change colour simultaneously when a potential is applied to the composition, and the "chameleon effect" occurring when electrochromic compounds change colour all one by one can be prevented. In one embodiment, the electrochomic compounds used as a dye may be chosen from inorganic electrochromic compounds, such as $WO_3$, $IrO_2$, $TiO_2$, $Nb_2O5$, $MoO_3$, $V_2O_5$, iron hexacyanoferrates (such as Prussian blue) and their mixtures; and organic electrochromic compounds, such as polythiophene and its derivatives including PEDOT, polyaniline, polypyrrole, metallopolymers, metallophtalocyanines, alkylviologens, arylviologens, arylalkylviologens, alkylarylviologens, or anthraquinone and its derivatives, and their mixtures. In another embodiment, the electrochomic compounds used as a dye may be selected from those of Formula (I), wherein $R^1$ and/or $R^2$ represent a phenyl group which is substituted in the para position. In still another embodiment, the electrochomic compounds used as a dye may be selected from those of Formula (II), wherein $R^{7a}$ and/or $R^{7b}$ represent a phenyl group which is substituted in the para position.

Optical brighteners are compounds well known to a person skilled in the art, which emit a fluorescent visible light when they are illuminated by UV radiation. The visible light which is produced by these compounds is therefore situated at least partially within the wavelength band comprised between 380 nm and 780 nm, in particular between 380 nm and 420 nm, corresponding to a blue colour. Optical brighteners are usually derivatives of benzoxazolyls, stilbenes, and benzotriazoles, such as derivatives of 4,4'-diaminostilbene-2,2' disulphonic acid. Examples of optical brighteners are available under the names FLUOLITE XMP a trademark of ICI, LECOPUR EGM, a trademark of SANDOZ, and UVITEX OB, a trademark of CIBA-GEIGY.

Examples of organic and inorganic pigments include quinacridones, isoindolinones with or without cobalt complexes resp. copper complexes, aryl amides, diarylides and lead/(sulfur)/chromium compounds. Examples of pigments are the following, wherein C.I. is the color index no.: phthalocyanine blue (pigment blue 15:3, C.I. 74160), cobalt blue (pigment blue 36, C.I. 77343), Toner cyan BG (Clariant), Permajet blue B2G (Clariant); phthalocyanine green (Pigment green 7, C.I. 74260), chromium sesquioxide; iron oxides; carbazole violet; and Monolith black C-K (CIBA Specialty Chemicals).

Organic dyes are compounds that are soluble in aqueous or organic solvents. They can be chosen among azo or diazo compounds, quinone derivatives, anthraquinone derivatives, indigoid compounds, phtalydes, phtalocyanine derivatives, porphyrines, styryl derivatives, quinophthalone derivatives, naphthazine derivatives, pyrazolone, and their mixtures, or can be derived from a halotriazine such as a dihalotriazine or monohalotriazine, especially water-soluble dichlorotriazines. Some of these organic dyes may also have electrochromic properties. Examples of organic dyes are available from CLARIANT under the trade names Savinyl, Solvaperm, Duasyn and Sanolyn, for instance.

In a preferred embodiment, the composition of the invention comprises at least one dye selected from the group consisting of organic or inorganic photochromic and/or dichroic substances and electrochromic substances distinct from the first constituent of this invention, and which may be selected among the above compounds of Formulas (I) and/or (II), in particular among compounds of formula III, or among different electrochromic compounds.

In this particular embodiment, the composition of the invention may comprise two dyes: the first dye being an electrochromic substance distinct from the first constituent of this invention, and which may be selected among the above compounds of Formulas (I) and/or (II), in particular among compounds of formula III or among different electrochromic compounds and the second dye being selected from the group consisting of organic or inorganic photochromic and/or dichroic substances.

The composition according to this invention may comprise a fluid, mesomorphous or gel host medium in which the electrochromic compounds are preferably dissolved. The fluid or mesomorphous host medium is preferably selected from the group consisting of organic solvents and/or liquid crystals.

Suitable solvents are redox-inert solvents which cannot react with the electrochromic compounds of the composition. Examples of suitable solvents are ethylene carbonate, propylene carbonate, γ-butyrolactone, γ-valerolactone, acetonitrile, propionitrile, benzonitrile, glutaronitrile, methylglutaronitrile, dimethylformamide, N-methylpyrrolidone, sulfolane, 3-methyl sulfolane, benzene, toluene, methyl ethyl ketone, acetone, ethanol, tetrahydrofurfuryl alcohol, 2-methoxyethyl ether, xylene, cyclohexane, 3-methylcyclohexanone, ethyl acetate, ethyl phenylacetate, tetrahydrofuran, methanol, methyl propionate, ethylene glycol ethylene carbonate, ionic liquids, and mixtures thereof. Preference is given to carbonate and particularly propylene carbonate.

The liquid crystal medium that may be used in the present invention includes, without being limited to, such materials as nematic or chiral nematic media.

The concentration of the oxidizing compounds in the composition depends on the desired absorption of the electrochromic composition in the coloured (i.e. activated) state. The concentration of the oxidizing compounds is typically from 0.001 to 0.5 M, preferably from 0.01 to 0.3 M, more preferably from 0.05 to 0.25 M. The ratio between each of the oxidizing compounds can be easily determined by the skilled person according to the colour of the electrochromic composition to be obtained.

The concentration of the reducing compound in the composition can be from 0.001 to 0.5 M, preferably from 0.01 to 0.3 M, more preferably from 0.05 to 0.25 M.

The composition of the invention may further comprise an inert current-carrying electrolyte. The inert current-carrying electrolyte should be compatible with the other components of the composition. In particular, the inert current-carrying electrolyte should not react with the electrochromic compounds. Examples of inert current-carrying electrolyte include alkali metal salts, lithium, sodium or tetraalkylammonium salts, aluminium chloride and aluminium boride, persulfates and bis(fluorosulfonyl)imide. The inert current-carrying electrolyte is preferably selected from sodium, lithium and tetraalkylammonium, ions in combination with inert anion selected preferably from chloride, tetrafluoroborate and perchlorate. Other examples of inert anions are tetraphenylborate, cyano-triphenylborate, tetramethoxyborate, tetrapropoxyborate, tetraphenoxyborate, perchlorate, chloride, nitrate, sulphate, phosphate, methanesulphonate, ethanesulphonate, tetradecanesulphonate, pentadecanesulphonate, trifluoromethanesulphonate, perfluorobutanesulphonate, perfluorooctanesulphonate, benzenesulphonate, chlorobenzenesulphonate, toluenesulphonate, butylbenzenesulphonate, tert-butylbenzenesulphonate, dodecylbenzenesulphonate, trifluoromethylbenzenesulphonate, hexafluorophosphate, hexafluoroarsenate or hexafluorosilicate. Most preferred inert current-carrying electrolyte is tetra-n-butylammonium tetrafluoroborate. When present in the electrochromic composition, the concentration of the inert current-carrying electrolyte is typically from 0.005 to 2 M, preferably from 0.01 to 1 M, more preferably from 0.05 to 0.5 M.

The electrochromic composition of the invention may comprise other additives such as thickening or gelling agents. The thickening or gelling agent should be inert to the other components of the composition, should be electrochemically stable and should not decrease significantly the conductivity of the electrochromic composition. Examples of thickening or gelling agents include acrylic polymers such as polyacrylates including polymethylmethacrylate, polyvinylacetate, polyurethanes, polystyrene, polyacetonitrile, cellulose derivatives such as carboxymethylcellulose, hydroxymethylcellulose, cellulose propionate or hydroxypropylmethylcellulose, gums or hydrocolloids such as gellan, carrageenan, pullulan, polyethylene oxide, polypropylene oxide, polyvinyl acetate, poly(N-vinyl pyrrolidone), and polyvinylidene fluoride. The concentration of the thickening or gelling agent will depend on the nature of the thickening agent and the viscosity desired for the electrochromic composition. Typically, the content of the thickening or gelling agent may be from 1 to 30 wt %, preferably from 3 to 20 wt %, more preferably from 5 to 15 wt % of the electrochromic composition.

Suitable further additives for the electrochromic medium for the occasionally desired protection against UV light (<350 nm) are UV absorbers. Examples are 2,4-dihydroxybenzophenone (UVINUL® 3000, BASF), 2-hydroxy-4-n-octyloxybenzophenone (SANDUVOR® 3035, Clariant), 2-(2H-benzotriazol-2-yl)-6-dodecyl-4-methylphenol (Tinuvin® 571, Ciba), 2,2'-dihydroxy-4-methoxy-benzophenone (Cyasorb 24™, American Cyanamid Company), ethyl 2-cyano-3,3-diphenylacrylate (UVINUL® 3035, BASF 2-ethylhexyl 2-cyano-3,3-diphenyl-acrylate (UVINUL® 3039, BASF), 2-ethylhexyl p-methoxycinnamate (UVINUL® 3088, BASF), 2-hydroxy-4-methoxy-benzophenone (CHIMASSORB® 90, Ciba), dimethyl 4-methoxybenzylidenemalonate (SANDUVOR® PR-25, Clariant).

The present invention also relates to an electrochromic device, in particular an optical article, comprising the composition of the invention.

The electrochromic device may be selected from an optical article such as an optical lens or an optical filter, a window, a visor, a mirror and a display, in particular a segmented or matrix display. Preferably, the electrochromic device of the invention is an optical lens, more preferably an ophthalmic lens. Non-limiting examples of ophthalmic lenses include corrective and non-corrective lenses, including single vision or multi-vision lenses, which may be either segmented or non-segmented, as well as other elements used to correct, protect, or enhance vision, including without limitation contact lenses, intra-ocular lenses, magnifying lenses and protective lenses or visors. Non-limiting examples of display elements and devices include screens and monitors. Non-limiting examples of windows include automotive, marine and aircraft windows, filters, shutters, and optical switches.

The device may contain functional layers such as polarizing layers, photochromic layers, anti-reflecting coatings, visible light and UV absorbing coatings, impact-resistant coatings, abrasion-resistant-coating, anti-smudge-coating, anti-fog coating, anti-dust coating, all of which are familiar to the skilled person. The electrochromic device of the invention may comprise a mechanism for holding the composition in a mechanically stable environment. For example, the electrochromic device of the invention comprises an electrochromic cell including two substrates facing each other. The substrates are preferably optical substrates such as any mineral or organic glass commonly known and used in the optical field. It may be sodocalcic ou borosilicate mineral glass for instance. It may be a thermoplastic resin such as a thermoplastic polycarbonate, or a thermoset or photo-cured resin such as polyurethane or polythiourethane. In case where the electrochromic device is used as an ophthalmic lens, the substrates used for manufacturing the cell may have a spherical shape or aspheric shape. The internal sides of the substrates may be coated with transparent conductive electrodes ("TCO"). The conductive electrodes may be formed of a transparent conductive material such as, for example indium tin oxide ("ITO"), fluorine-doped in oxide ("FTO"). The sheet resistance of these TCO must be below 100 ohm/square, preferably below 40 ohm/square, and even preferably below 10 ohm/square. The substrates may be held at fixed distance from each other, for example with a spacer of 10 µm to 200 µm, preferably of 20 to 150 µm, and more preferably of 75 µm, in order to form a gap wherein the electrochromic composition is introduced.

Another device of the present invention comprises an optical component provided with at least one transparent cell arrangement juxtaposed in a parallel direction to the surface thereof, as disclosed in WO 2006/013250, each cell being tightly closed and containing said fluid, mesomorphous or gel host medium and said at least one compound of the present invention. Other devices according to the invention can be a device as described in FR 2937154 or FR2950710 comprising at least one compound of the invention.

EXAMPLES

This invention will be further illustrated by the following non-limiting examples which are given for illustrative purposes only and should not restrict the scope of the appended claims.

Example 1: Composition Comprising Electrochromic Compounds and a Photochromic Substance A composition was prepared by dissolving, in propylene carbonate (82.3 wt. %):
the electrochromic compound corresponding to Formula I-10 above (3.5 wt. %),
the electrochromic compound corresponding to Formula III-10 above (2.0 wt. %),
10-methylphenothiazine (5.9 wt. %) as a reducing agent,
a photochromic substance of the naphtopyrane type, produced by VIVIMED LABS under the trade name Reversacol® Berry Red (0.8 wt. %), and
tetrabutylammonium tetrafluoroborate, hereafter designated as TBA $BF_4^-$ (5.5 wt. %).

A tank was filled at room temperature and atmospheric pressure with the electrochromic composition as described above. A cell was then placed vertically in the tank under atmospheric pressure in such way that the opening was located above the solution level. This cell included two mineral glass substrates facing each other, the internal sides of which were coated with transparent conductive electrodes made of indium tin oxide (ITO). The substrates were held at fixed distance from one another by using spacers of 75 µm, in order to form a gap. The edge of the cell was sealed with a UV curable adhesive in such a way that an opening of 5 mm was left.

The tank with the cell was placed in a vacuum-desiccator, which was evacuated to 0.5 mBar. During the aeration of the tank under the introduction of an inert gas, the electrochromic formulation filled the entire volume of the gap through the opening. The opening was then sealed with a UV curable adhesive in order to make the cell hermetic. The electrical connection was made by two silver plated copper wires, sealed on each ITO glass substrate with a silver charged epoxy adhesive.

A potential of 0.9V was applied between the electrodes and the color obtained was assessed visually. It was observed that the composition was slightly pink in the inactive state and that this colour was only due to the photochromic substance included therein. After activation, the sample had a nice grey-purple colour which changed reversibly when reversing the polarity.

The transmission level (Tv) of the composition was also measured according to the ISO Standard 8980-3, in the 380 nm-800 nm wavelength range, using a spectrophotometer. It corresponds to the transmission factor as defined in the ISO Standard 13666:1998. It was observed that Tv decreased from 75% to 16% when applying the electrical potential.

It was further noticed that the coloration/discoloration kinetics did not seem to be affected by the presence of the photochromic substance.

The photochromic substance also kept its photochromic properties, which was checked by activating the sample with a UV lamp (v1208b1 of 2×8 W, 365 nm, 1400 µW/cm$^2$). The photochromic substance coloured in red when activated by the UV light.

This example demonstrates that it is possible to obtain both a photochromic effect and an electrochromic effect using the above composition. The sample which was both UV- and electrically activated had a dark purple colour.

Example 2: Composition Comprising an Electrochromic Compound and an Organic Dye A composition was prepared by dissolving, in propylene carbonate (88.8 wt. %):
the electrochromic compound corresponding to Formula I-10 above (4.3 wt. %),
ferrocene (1.2 wt. %) as a reducing agent,
an organic dye, which was an azo metal complex dye supplied by CLARIANT under the trade name Savinyl® Red 2 BLSE (1.4 wt. %), and
tetrabutylammonium tetrafluoroborate, hereafter designated as TBA $BF_4^-$ (4.3 wt. %).

This composition has a red colour in the inactive state, which was due to the presence of the organic dye. Its colour turned to brown when voltage of 0.9V was applied to the electrochromic device.

Example 3: Composition Comprising an Electrochromic Compound and a Dichroic Compound A composition was prepared by dissolving, in propylene carbonate (92.35 wt. %):
the electrochromic compound corresponding to Formula I-10 above (1.48 wt. %),
Methylphenothiazine (1.21 wt. %) as a reducing agent,
a mixture of three dichroic dyes, which were anthraquinone derivatives supplied by NEMATEL under the trade name Blue AB4® (0.95 wt. %), Red® AR1 (0.84 wt. %), and Yellow® AG1 (0.86 wt. %), and
tetrabutylammonium tetrafluoroborate, hereafter designated as TBA $BF_4^-$ (2.31 wt. %).

This composition has a dark blue colour in the inactive state, which was due to the presence of the dichroic dyes. As the dichroic dyes were not oriented in the same direction, the residual colour corresponded to the absorption obtained with an average orientation of the molecules.

Its colour turned to dark green when a voltage of 0.9V was applied to the electrochromic device.

It has also been checked that the colour of the dichroic compound was not modified with the application of the voltage.

Example 4: Composition Comprising Electrochromic Compounds and Liquid Crystals A composition was prepared by dissolving, in propylene carbonate (40.0 wt. %):
the electrochromic compound corresponding to Formula I-10 above (2.0 wt. %),
the electrochromic compound corresponding to Formula III-10 above (0.9 wt. %),
10-methylphenothiazine (1.4 wt. %) as a reducing agent,
liquid crystals sold by MERCK under the trade name E7 (53.8 wt. %), and
tetrabutylammonium tetrafluoroborate, hereafter designated as TBA $BF_4^-$ (1.9 wt. %).

The transmission rate of the composition, which was initially clear (uncoloured), decreased from 82% when in the inactive state to 30% when electrically activated (with a voltage of 0.9V) and its colour simultaneously turned to a grey-green colour.

This example shows that the presence of liquid crystals in a composition of this invention, even in high amounts, does not affect the electrochromic properties of the composition. It is thus possible to incorporate dichroic compounds and to orientate them, as said dichroic compounds need to be formulated into liquid crystals.

Example 5: Composition Comprising Two Electrochromic Compounds

A composition was prepared by dissolving, in propylene carbonate (82.1 wt. %):
the electrochromic compound corresponding to Formula I-18 above (3.7 wt. %),
the electrochromic compound corresponding to Formula III-4 above (1.0 wt. %),
phenoxazine (1.9 wt. %) as a reducing agent,
PMMA (7.8 wt. %), and
tetrabutylammonium tetrafluoroborate, hereafter designated as TBA $BF_4^-$ (3.5 wt. %), wherein one of the electrochromic compounds was used as a dye according to this invention.

At the inactive state, the composition had a yellow colour which turned to brown when a voltage of 1.1V was applied. When the polarity was reversed, the colour turned back to pale brown but did not return to yellow. The colour of the composition thus changed from brown to light brown and vice versa over several cycles.

Example 6: Composition Comprising Two Electrochromic Compounds

A composition was prepared by dissolving, in propylene carbonate (92 wt. %):
the electrochromic compound corresponding to Formula I-25 above (2.4 wt. %),
the electrochromic compound corresponding to Formula III-3 above (0.9 wt. %),
phenoxazine (1.1 wt. %) as a reducing agent, and
tetrabutylammonium tetrafluoroborate, hereafter designated as TBA $BF_4^-$ (3.6 wt. %), wherein one of the electrochromic compounds is used as a dye according to this invention.

During successive activation cycles (with application of a voltage of 1V), the colour of the composition varied from pale green to dark green and vice versa.

The invention claimed is:
1. An electrochromic composition comprising:
   at least one reducing compound;
   at least one dye;
   at least one electrochromic oxidizing compound selected from viologen derivatives of formula (I)

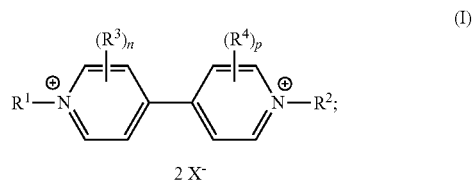

at least one least one electrochromic oxidizing compound selected from viologen derivatives of formula (II)

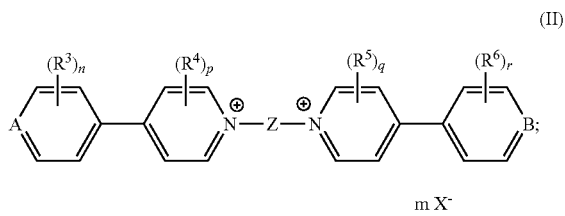

(II)

m X⁻ wherein
- $R^1$ and $R^2$ are each independently selected from optionally substituted phenyl groups;
- $R^3$, $R^4$, $R^5$ and $R^6$ are each independently selected from H, alkyl, alkoxy, alkylthio, haloalkyl, haloalkoxy, haloalkythio, polyakylenoxy, alkoxycarbonyl, aryl, substituted aryl, heteroaryl and substituted heteroaryl, wherein the alkyl group may be substituted by one or more substituents independently selected from alkoxy, cycloalkyl, aryl, substituted aryl, heteroaryl and substituted heteroaryl;
- n, p, q and r are each independently an integer from 0 to 4, wherein when n, p, q or r are two or more, each of the $R^3$, each of the $R^4$, each of the $R^5$ or each of the $R^6$ may be identical or different;
- A and B are respectively selected from nitrogen and —$N^+(R^{7a})$—, and from nitrogen and —$N^+(R^{7b})$—, wherein $R^{7a}$ and $R^{7b}$ are independently selected from:
  - alkyl which may be substituted by one or more groups independently selected from halogen, alkoxy, cycloalkyl, vinyl, allyl, aryl, substituted aryl, heteroaryl and substituted heteroaryl;
  - aryl and heteroaryl which may be both substituted by one or more groups independently selected from:
    - halogen, cyano, nitro, alkyl, haloalkyl, arylalkyl, cycloalkyl, cycloalkylalkyl and heterocycloalkylalkyl, alkenyl, alkynyl, allyl, vinyl, aryl, substituted aryl, heteroaryl, substituted heteroaryl, —N(aryl)$_2$, —N(aryl)CO(aryl), —CO-aryl and —CO-substituted aryl;
    - —$OR^8$, —$SR^8$, —$S(O)R^8$, —$S(O_2)R^8$, —$S(O_2)NR^8R^9$, —$NR^8R^9$, —$NR^8COR^9$, —$NR^8CO(aryl)$, —$NR^8 aryl$, —$CH_2OR^8$, —$CH_2SR^8$, —$CH_2NR^8R^9$, —CO—$R^8$ and —$CO_2R^8$ wherein $R^8$ and $R^9$ are independently selected from H, alkyl, haloalkyl, arylalkyl, cycloalkyl, cycloalkylalkyl and heterocycloalkylalkyl;
    - —$S(O_2)NR^{10}R^{11}$ and —$NR^{10}R^{11}$, wherein $R^{10}$ and $R^{11}$ form together with the nitrogen atom to which they are linked a saturated 5 to 7 membered heterocycloalkyl which may comprise in addition to the nitrogen atom one further heteroatom selected from oxygen, nitrogen and sulphur, and which may be optionally substituted by one or two groups independently selected from halogen, —$R^8$, —$OR^8$, and —$NR^8R^9$, wherein $R^8$ and $R^9$ are as defined above;
    - —V—W—$R^{12}$ wherein:
      - V is selected from oxygen, —$N(R^8)$—, sulphur, —S(O)— and —$S(O_2)$— wherein $R^8$ is as defined above;
      - W is alkylene, which may be substituted by one or more groups independently selected from halogen and alkoxy; and
      - $R^{12}$ is selected from —$OR^8$, —$NR^8(alkyl)$ and —$SR^8$ wherein $R^8$ is as defined above; and
    - —OC(O)—$R^{13}$ wherein $R^{13}$ is selected from alkyl, haloalkyl, alkenyl, —W—$R^{12}$, and aryl group which may be substituted by 1 to 4 groups selected from halogen, —$R^8$, —$OR^8$, —$SR^8$, —$NR^8R^9$, —$NR^{10}R^{11}$, —CO—$R^8$, —$C(O)OR^8$, wherein $R^8$, $R^9$, $R^{10}$, $R^{11}$, $R^{12}$ and W are as defined above;
- Z is selected from:
  - alkylene;
  - cycloalkylene; and
  - a bivalent groups of formula —$R^{14}$—Y—$R^{15}$—, wherein
    - $R^{14}$ and $R^{15}$ are each independently selected from single bond, alkylene and cycloalkylene; and
    - Y is selected from arylene, cycloalkylene, heteroarylene, arylene-arylene or arylene-CR'R"-arylene wherein R' and R" form together with the carbon to which they are linked a carbocyclic group;
  - wherein said alkylene, cycloalkylene, arylene, heteroarylene and carbocyclic groups may be substituted by one or more substituents selected from halogen, alkyl, alkoxy, alkylthio, hydroxyalkyl, acyloxy, cycloalkyl, aryl, substituted aryl, aryloxy heteroaryl and substituted heteroaryl;
- m is 2 if A and B are nitrogen, 3 if one of A and B is nitrogen and the other is not nitrogen, and 4 if both A and B are not nitrogen; and
- X" is a counterion.

2. The electrochromic composition according to claim 1, wherein Z is selected from $C_1$-$C_{12}$ alkylene, aryl substituted $C_1$-$C_{12}$ alkylene, phenylene, naphthylene, ($C_1$-$C_4$ alkylene)-phenylene-($C_1$-$C_4$ alkylene), ($C_1$-$C_4$ alkylene)-naphthylene-($C_1$-$C_4$ alkylene), quinoxaline-2,3-diyl, ($C_1$-$C_4$ alkylene)-quinoxaline-2,3-diyl-($C_1$-$C_4$ alkylene), phenylene-phenylene, ($C_1$-$C_4$ alkylene)-phenylene-phenylene-($C_1$-$C_4$ alkylene) and phenylene-fluorenylene-phenylene, preferably Z is selected from —$CH_2$—, —$(CH_2)_2$—, —$(CH_2)_3$—, —$(CH_2)_4$—, —$(CH_2)_5$—, —$CH_2$—$CH(CH_3)$—$CH_2$—, —$CH_2$—$CH(CH_2Phenyl)$-$CH_2$—, —$(CH_2)_2$—$CH(CH_3)$—$CH_2$—, —$(CH_2)_3$—$CH(CH_3)$—$CH_2$—, —$(CH_2)_2$—$CH(CH_3)$—$(CH_2)_2$—,

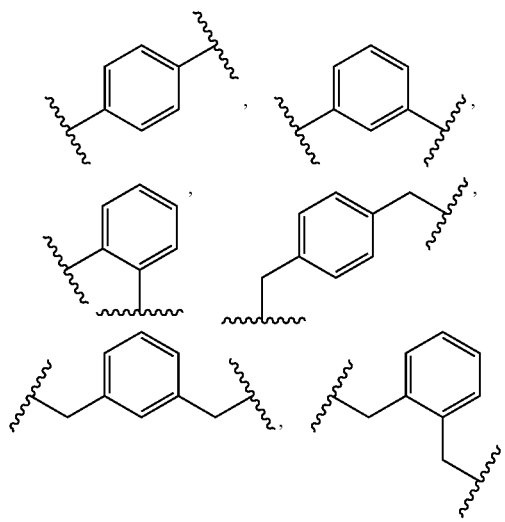

-continued

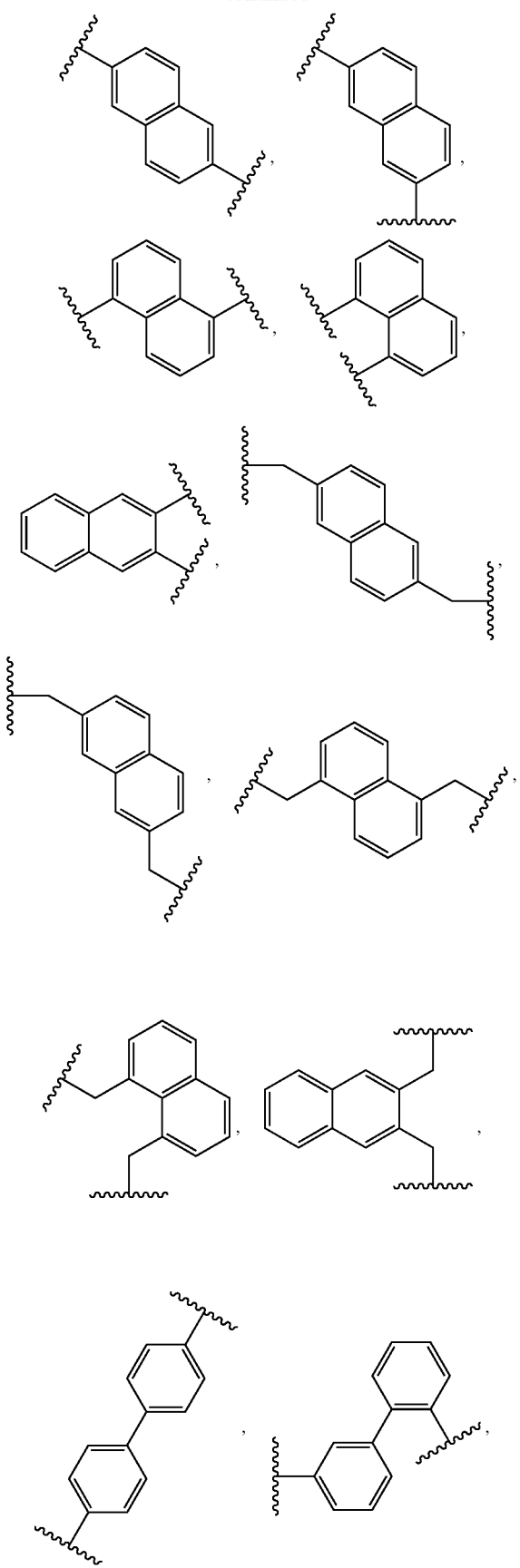

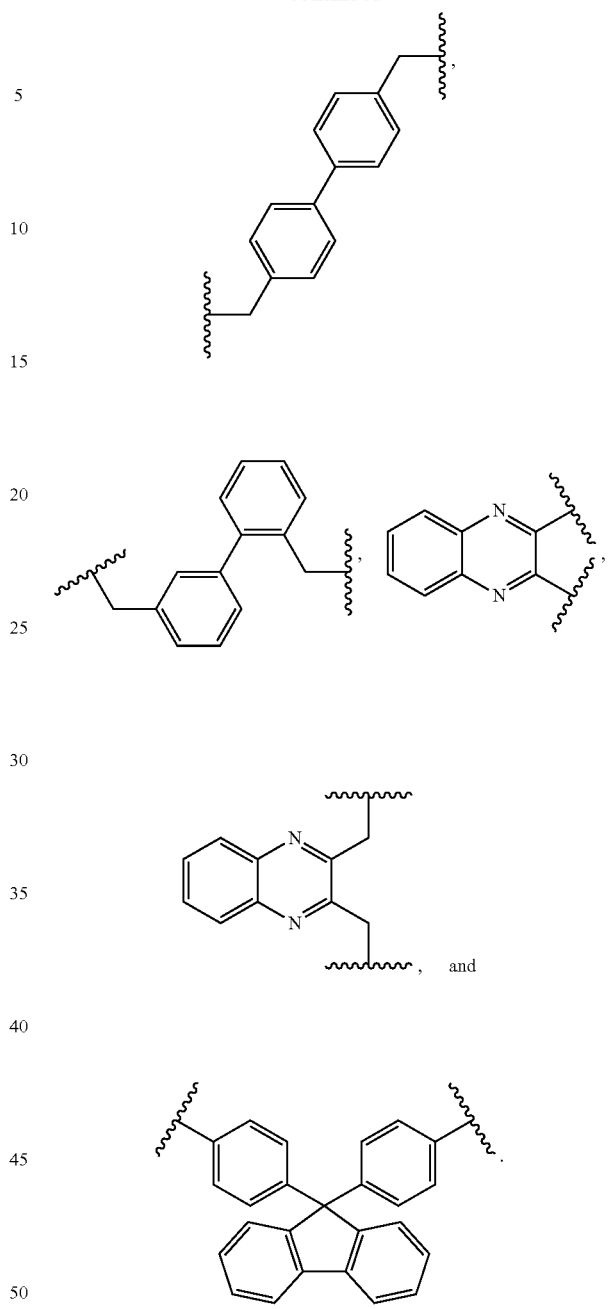

3. The electrochromic composition according to claim 1, wherein $R^3$, $R^4$, $R^5$ and $R^6$ are each independently selected from $C_1$-$C_4$ alkyl, $C_1$-$C_4$ alkoxycarbonyl, alkanoyl, aroyl, aryl and heteroaryl, wherein the aryl and heteroaryl may be substituted by one or more substituents selected from $C_1$-$C_4$ alkyl and $C_1$-$C_4$ haloalkyl, preferably, $R^3$, $R^4$, $R^5$ and $R^6$ are each independently selected from methyl, ethoxycarbonyl, phenyl, p-methylphenyl and p-trifluoromethylphenyl.

4. The electrochromic composition according to claim 1, wherein the counterion $X^-$ is selected from halide, tetrafluoroborate, tetraphenylborate, hexafluorophosphate, nitrate, methanesulfonate, trifluoromethane sulfonate, toluene sulfonate, hexachloroantimonate, bis(trifluoromethanesulfonyl)imide, perchlorate, acetate and sulfate.

5. The electrochromic composition according to claim 1, wherein at least one of the viologen derivatives is selected from compounds of formula (III):

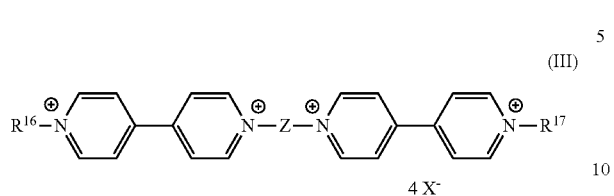

(III)

wherein Z, and $X^-$ are as defined in formula (II), and $R^{16}$ and $R^{17}$ are selected from alkyl and optionally substituted phenyl groups.

6. The electrochromic composition according to claim 1, wherein at least one of the viologen derivatives is selected from compounds of formula (IV):

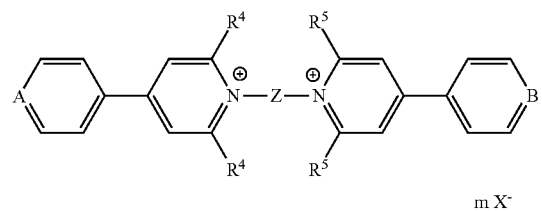

(IV)

wherein $R^4$, $R^5$, Z, A, B, m and $X^-$ are as defined in formula (II) and at least one of $R^4$ and $R^5$ is not H.

7. The electrochromic composition according to claim 1, wherein said viologen derivatives are selected from compounds I-1 to I-50, III-1 to 111-18 and IV-1 and IV-14:

| Compound | Formula |
|---|---|
| I-1 | ![phenyl-bipyridinium-phenyl, 2 BF$_4^-$] |
| I-2 | ![(4-methylphenyl)-bipyridinium-(4-methylphenyl), 2 PF$_6^-$] |
| I-3 | ![(4-isopropylphenyl)-bipyridinium-(4-isopropylphenyl), 2 BF$_4^-$] |
| I-4 | ![(4-isopropylphenyl)-bipyridinium-(4-isopropylphenyl), 2 N(SO$_2$CF$_3$)$_2^-$] |
| I-5 | ![(4-tert-butylphenyl)-bipyridinium-(4-tert-butylphenyl), 2 BF$_4^-$] |
| I-6 | ![(4-n-C$_4$H$_9$-phenyl)-bipyridinium-(4-n-C$_4$H$_9$-phenyl), 2 BF$_4^-$] |
| I-7 | ![(4-n-C$_5$H$_{11}$-phenyl)-bipyridinium-(4-n-C$_5$H$_{11}$-phenyl), 2 BF$_4^-$] |

-continued
| Compound | Formula |
|---|---|
| I-8 | 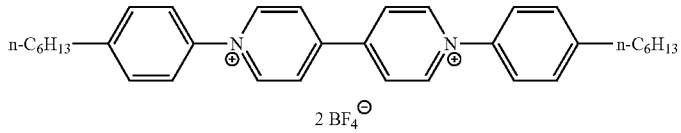 |
| I-9 | 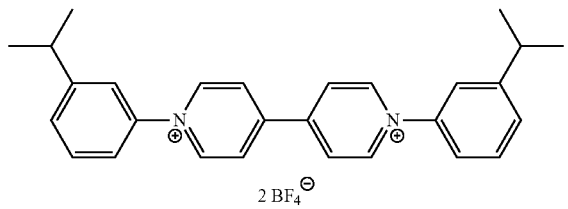 [SMILES: CC(C)c1cccc(-[n+]2ccc(-c3cc[n+](-c4cccc(C(C)C)c4)cc3)cc2)c1] |
| I-10 | 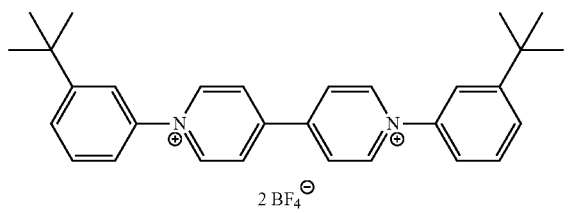 [SMILES: CC(C)(C)c1cccc(-[n+]2ccc(-c3cc[n+](-c4cccc(C(C)(C)C)c4)cc3)cc2)c1] |
| I-11 | 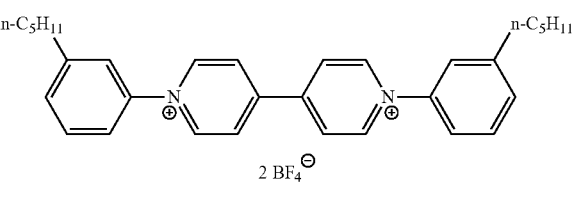 |
| I-12 | 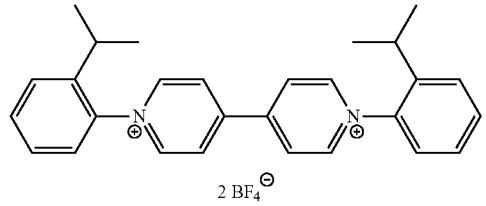 [SMILES: CC(C)c1ccccc1-[n+]1ccc(-c2cc[n+](-c3ccccc3C(C)C)cc2)cc1] |
| I-13 | 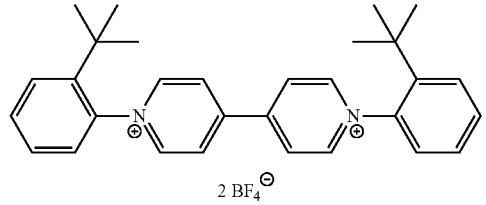 [SMILES: CC(C)(C)c1ccccc1-[n+]1ccc(-c2cc[n+](-c3ccccc3C(C)(C)C)cc2)cc1] |
| I-14 | 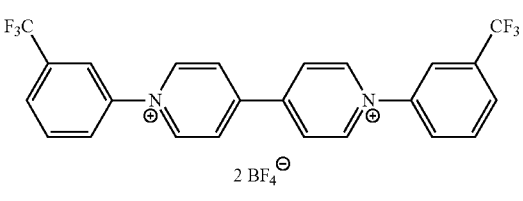 |

-continued

| Compound | Formula |
|---|---|
| I-15 | 3,5-bis(CF₃)-phenyl—N⁺(pyridinium)—(pyridinium)N⁺—phenyl-3,5-bis(CF₃); 2 BF₄⁻ |
| I-16 | 4-MeO-phenyl—N⁺(pyridinium)—(pyridinium)N⁺—phenyl-4-OMe; 2 PF₆⁻ |
| I-17 | 4-MeO-phenyl—N⁺(pyridinium)—(pyridinium)N⁺—phenyl-4-OMe; 2 ClO₄⁻ |
| I-18 | 4-iPrO-phenyl—N⁺(pyridinium)—(pyridinium)N⁺—phenyl-4-OiPr; 2 BF₄⁻ |
| I-19 | 4-(F₃CO)-phenyl—N⁺(pyridinium)—(pyridinium)N⁺—phenyl-4-(OCF₃); 2 BF₄⁻ |
| I-20 | 3-(F₃CO)-phenyl—N⁺(pyridinium)—(pyridinium)N⁺—phenyl-3-(OCF₃); 2 BF₄⁻ |
| I-21 | 2-(F₃CO)-phenyl—N⁺(pyridinium)—(pyridinium)N⁺—phenyl-2-(OCF₃); 2 BF₄⁻ |
| I-22 | 4-(F₃CO)-phenyl—N⁺(pyridinium)—(pyridinium)N⁺—phenyl-2-(OCF₃); 2 BF₄⁻ |

-continued

| Compound | Formula |
|---|---|
| I-23 | NC–C₆H₄–N⁺(pyridyl)–(pyridyl)N⁺–C₆H₄–CN, 2 BF₄⁻ |
| I-24 | 3-NC-C₆H₄–N⁺(pyridyl)–(pyridyl)N⁺–C₆H₄-3-CN, 2 BF₄⁻ |
| I-25 | HO(CH₂)₂–C₆H₄–N⁺(pyridyl)–(pyridyl)N⁺–C₆H₄–(CH₂)₂OH, 2 BF₄⁻ |
| I-26 | EtO₂C–C₆H₄–N⁺(pyridyl)–(pyridyl)N⁺–C₆H₄–CO₂Et, 2 BF₄⁻ |
| I-27 | 3-(EtO₂C)-C₆H₄–N⁺(pyridyl)–(pyridyl)N⁺–C₆H₄-3-(CO₂Et), 2 BF₄⁻ |
| I-28 | EtO₂C–CH₂–C₆H₄–N⁺(pyridyl)–(pyridyl)N⁺–C₆H₄–CH₂–CO₂Et, 2 BF₄⁻ |
| I-29 | EtO₂C–CH=CH–C₆H₄–N⁺(pyridyl)–(pyridyl)N⁺–C₆H₄–CH=CH–CO₂Et, 2 BF₄⁻ |
| I-30 | Ph–CH₂–C₆H₄–N⁺(pyridyl)–(pyridyl)N⁺–C₆H₄–CH₂–Ph, 2 BF₄⁻ |

-continued
| Compound | Formula |
|---|---|
| I-31 | 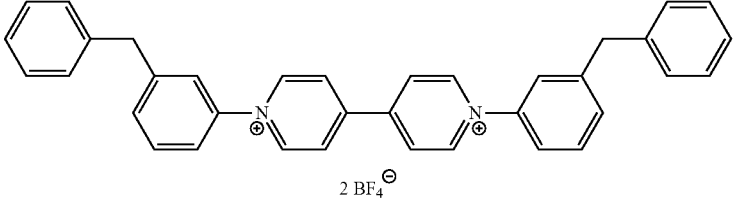 [SMILES: c1ccc(Cc2cccc(-[n+]3ccc(-c4cc[n+](-c5cccc(Cc6ccccc6)c5)cc4)cc3)c2)cc1] |
| I-32 | 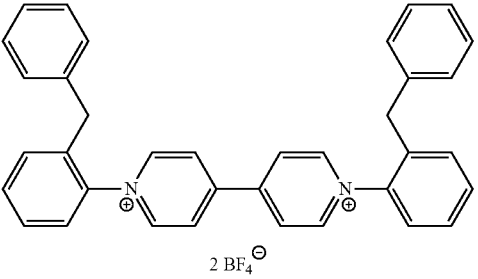 [SMILES: c1ccc(Cc2ccccc2-[n+]2ccc(-c3cc[n+](-c4ccccc4Cc4ccccc4)cc3)cc2)cc1] |
| I-33 | 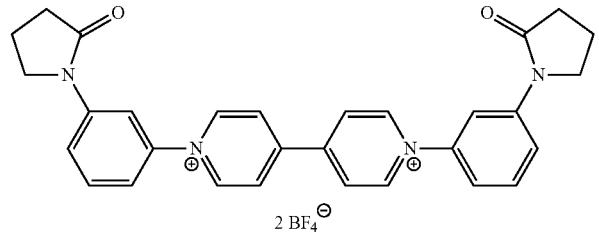 |
| I-34 | 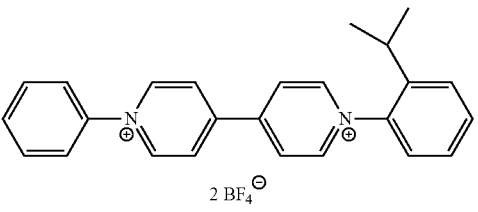 [SMILES: CC(C)c1ccccc1-[n+]1ccc(-c2cc[n+](-c3ccccc3)cc2)cc1] |
| I-35 | 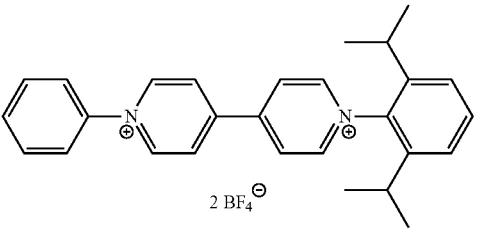 [SMILES: CC(C)c1cccc(C(C)C)c1-[n+]1ccc(-c2cc[n+](-c3ccccc3)cc2)cc1] |
| I-36 | 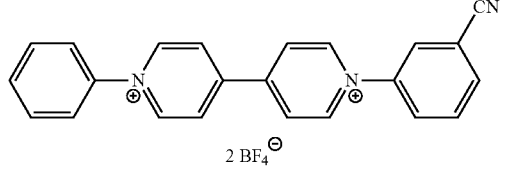 [SMILES: N#Cc1cccc(-[n+]2ccc(-c3cc[n+](-c4ccccc4)cc3)cc2)c1] |

| Compound | Formula |
|---|---|
| I-37 | 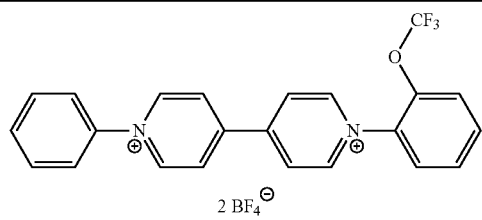 |
| I-38 | 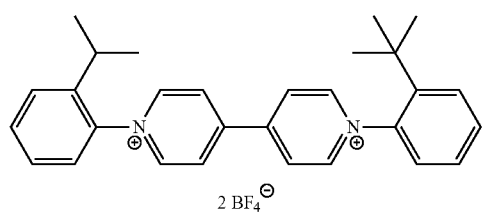 |
| I-39 | 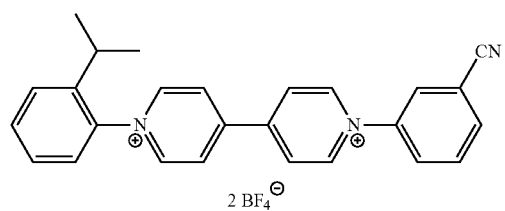 |
| I-40 | 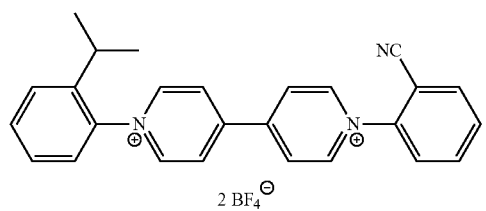 |
| I-41 | 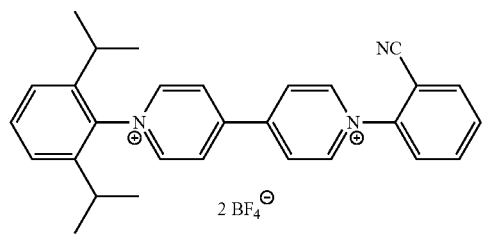 [SMILES: CC(C)c1cccc(C(C)C)c1-[n+]1ccc(-c2cc[n+](-c3ccccc3C#N)cc2)cc1] |
| I-42 | 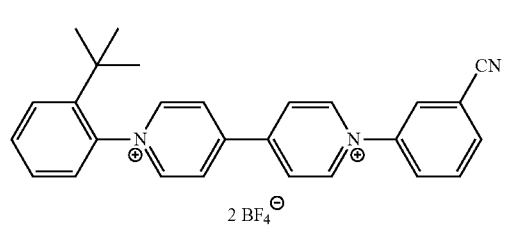 |
| I-43 | 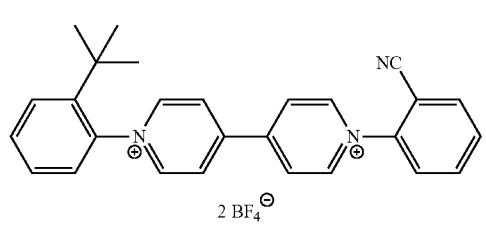 [SMILES: CC(C)(C)c1ccccc1-[n+]1ccc(-c2cc[n+](-c3ccccc3C#N)cc2)cc1] |

| Compound | Formula |
|---|---|
| I-44 | 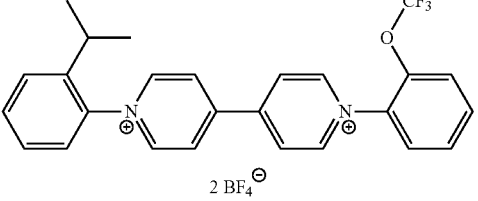 |
| I-45 | 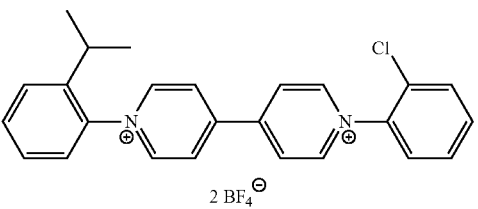 |
| I-46 | 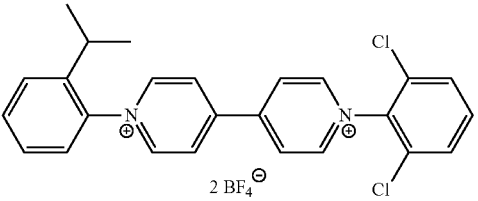 [SMILES: CC(C)c1ccccc1-[n+]1ccc(-c2cc[n+](-c3c(Cl)cccc3Cl)cc2)cc1] |
| I-47 | 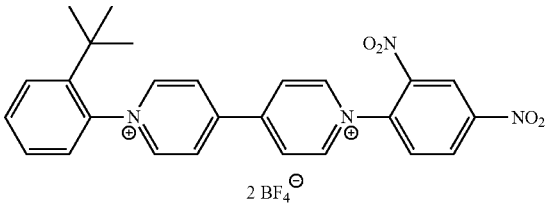 [SMILES: CC(C)(C)c1ccccc1-[n+]1ccc(-c2cc[n+](-c3ccc([N+](=O)[O-])cc3[N+](=O)[O-])cc2)cc1] |
| I-48 | 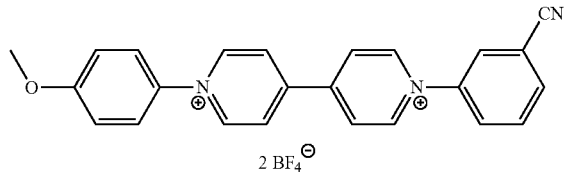 [SMILES: COc1ccc(-[n+]2ccc(-c3cc[n+](-c4cccc(C#N)c4)cc3)cc2)cc1] |
| I-49 | 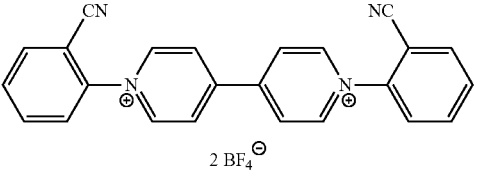 |
| I-50 | 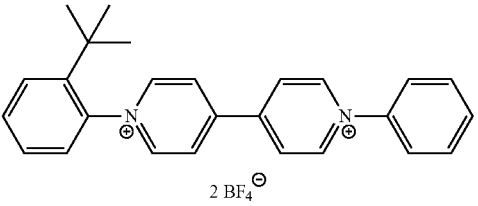 |

-continued
| Compound | Formula |
|---|---|
| III-1 | 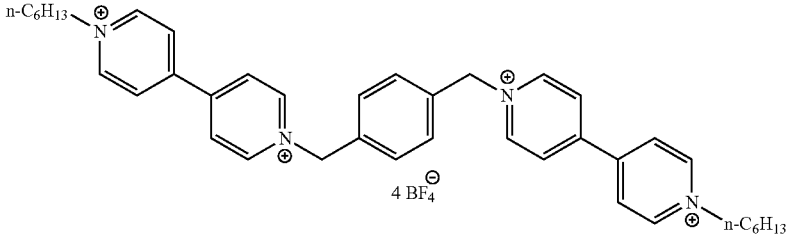 |
| III-2 | 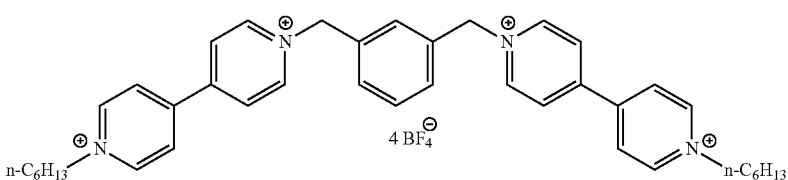 |
| III-3 | 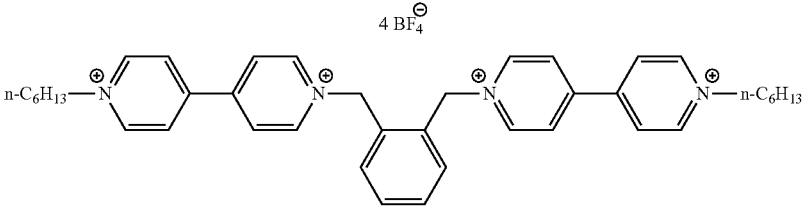 |
| III-4 | 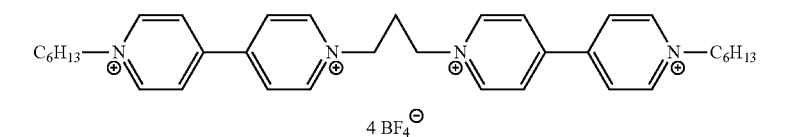 |
| III-5 | 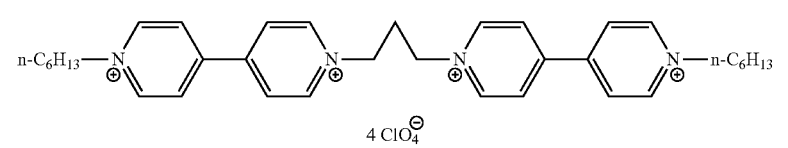 |
| III-6 | 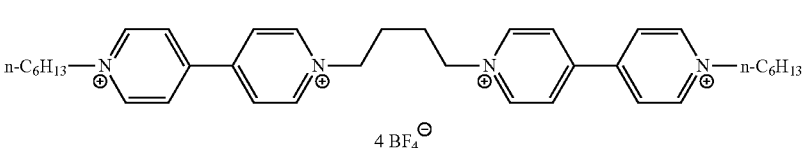 |
| III-7 | 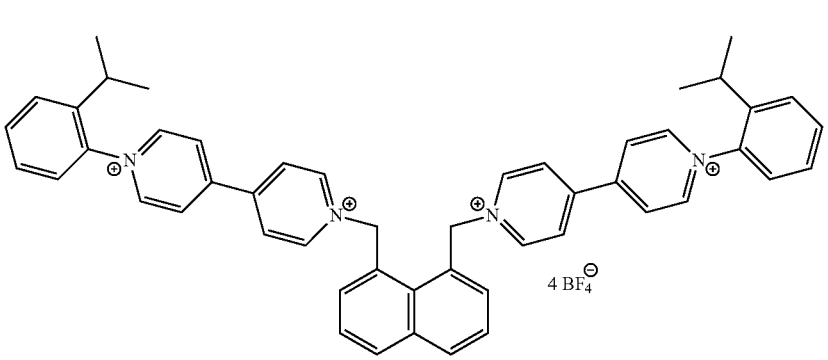 [SMILES: CC(C)c1ccccc1-[n+]1ccc(-c2cc[n+](Cc3cccc4cccc(C[n+]5ccc(-c6cc[n+](-c7ccccc7C(C)C)cc6)cc5)c34)cc2)cc1] |

-continued
| Compound | Formula |
|---|---|
| III-8 | 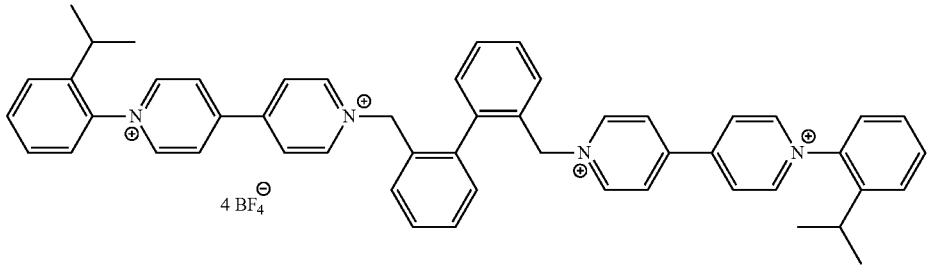 [SMILES: CC(C)c1ccccc1-[n+]1ccc(-c2cc[n+](Cc3ccccc3-c3ccccc3C[n+]3ccc(-c4cc[n+](-c5ccccc5C(C)C)cc4)cc3)cc2)cc1] |
| III-9 | 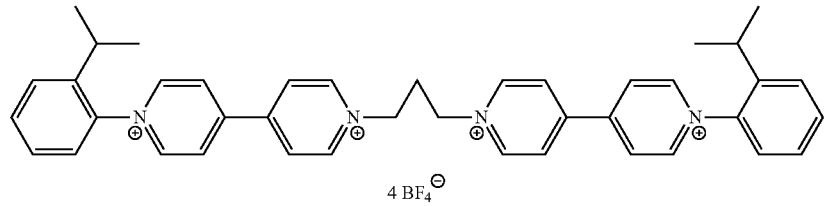 [SMILES: CC(C)c1ccccc1-[n+]1ccc(-c2cc[n+](CCC[n+]3ccc(-c4cc[n+](-c5ccccc5C(C)C)cc4)cc3)cc2)cc1] |
| III-10 | 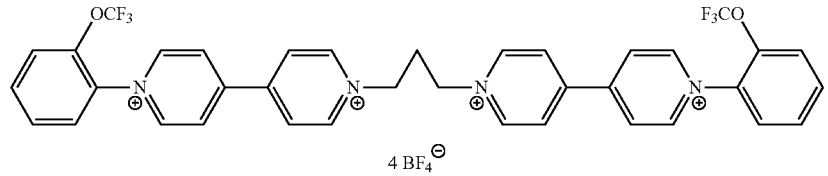 [SMILES: FC(F)(F)Oc1ccccc1-[n+]1ccc(-c2cc[n+](CCC[n+]3ccc(-c4cc[n+](-c5ccccc5OC(F)(F)F)cc4)cc3)cc2)cc1] |
| III-11 | 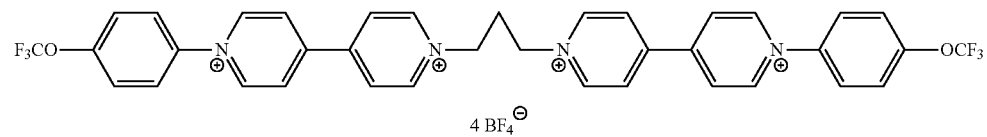 |
| III-12 | 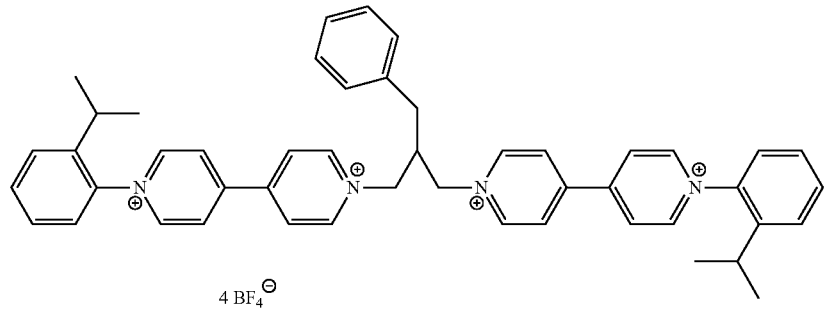 [SMILES: CC(C)c1ccccc1-[n+]1ccc(-c2cc[n+](CC(Cc3ccccc3)C[n+]3ccc(-c4cc[n+](-c5ccccc5C(C)C)cc4)cc3)cc2)cc1] |
| III-13 | 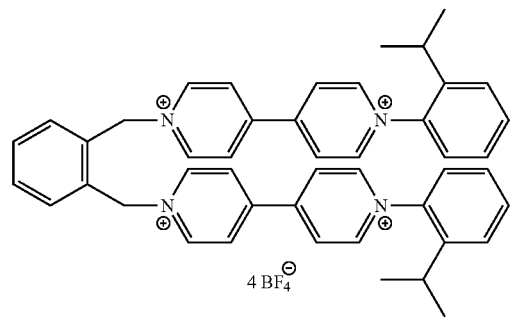 [SMILES: CC(C)c1ccccc1-[n+]1ccc(-c2cc[n+](Cc3ccccc3C[n+]3ccc(-c4cc[n+](-c5ccccc5C(C)C)cc4)cc3)cc2)cc1] |

| Compound | Formula |
|---|---|
| III-14 | 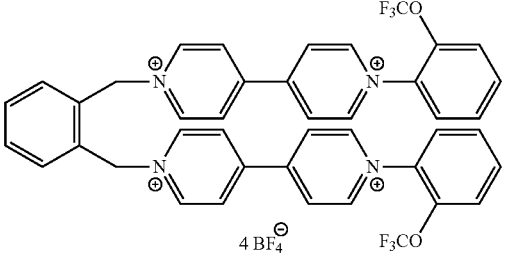 |
| III-15 | 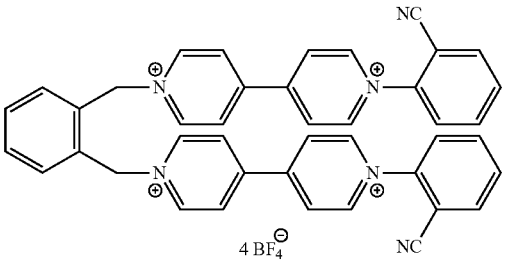 [SMILES: FC(F)(F)Oc1ccccc1-[n+]1ccc(-c2cc[n+](Cc3ccccc3C[n+]3ccc(-c4cc[n+](-c5ccccc5OC(F)(F)F)cc4)cc3)cc2)cc1] |
| III-16 | 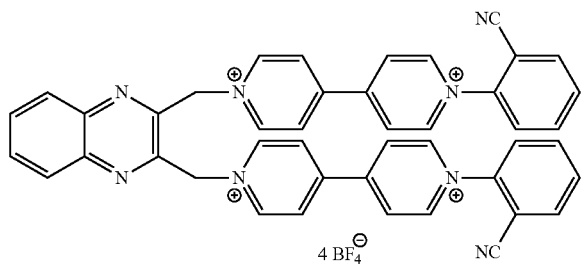 [SMILES: N#Cc1ccccc1-[n+]1ccc(-c2cc[n+](Cc3nc4ccccc4nc3C[n+]3ccc(-c4cc[n+](-c5ccccc5C#N)cc4)cc3)cc2)cc1] |
| III-17 | 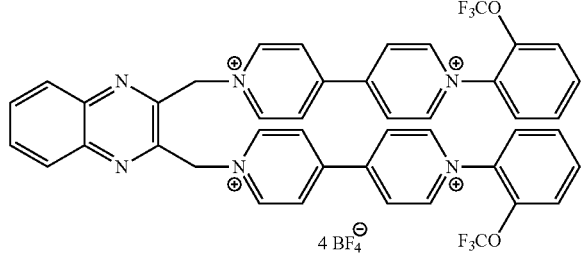 |
| III-18 | 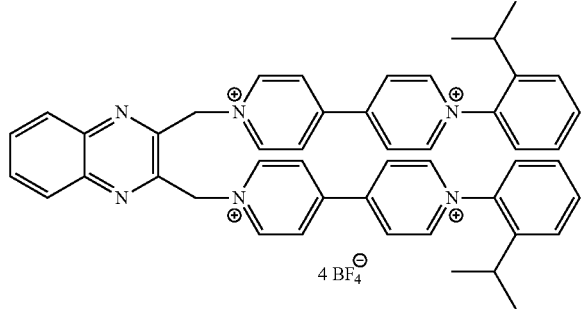 [SMILES: CC(C)c1ccccc1-[n+]1ccc(-c2cc[n+](Cc3nc4ccccc4nc3C[n+]3ccc(-c4cc[n+](-c5ccccc5C(C)C)cc4)cc3)cc2)cc1] |

-continued
| Compound | Formula |
|---|---|
| III-19 | 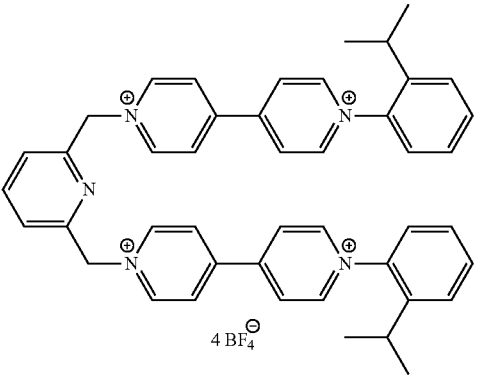 [SMILES: CC(C)c1ccccc1-[n+]1ccc(-c2cc[n+](Cc3cccc(C[n+]4ccc(-c5cc[n+](-c6ccccc6C(C)C)cc5)cc4)n3)cc2)cc1] |
| IV-1 | 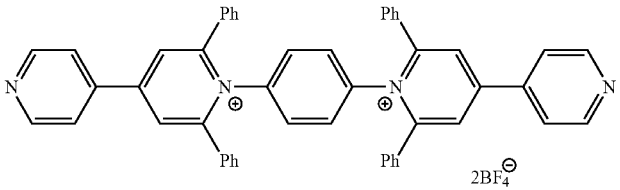 [SMILES: c1ccc(-c2cc(-c3ccncc3)cc(-c3ccccc3)[n+]2-c2ccc(-[n+]3c(-c4ccccc4)cc(-c4ccncc4)cc3-c3ccccc3)cc2)cc1] |
| IV-2 | 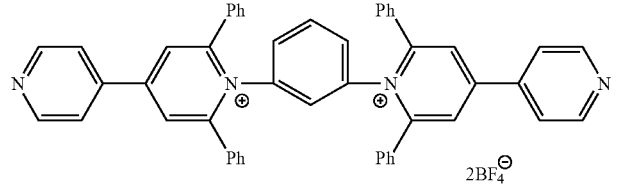 [SMILES: c1ccc(-c2cc(-c3ccncc3)cc(-c3ccccc3)[n+]2-c2cccc(-[n+]3c(-c4ccccc4)cc(-c4ccncc4)cc3-c3ccccc3)c2)cc1] |
| IV-3 | 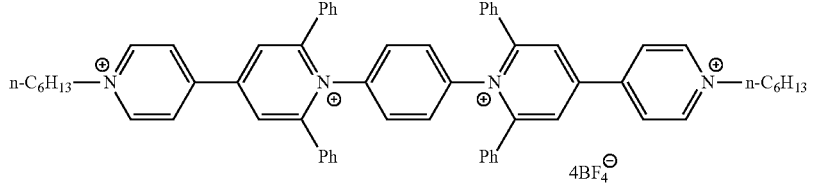 |
| IV-4 | 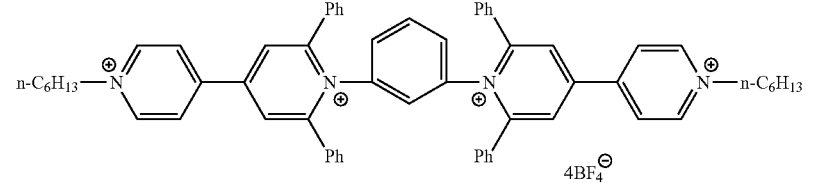 |
| IV-5 | 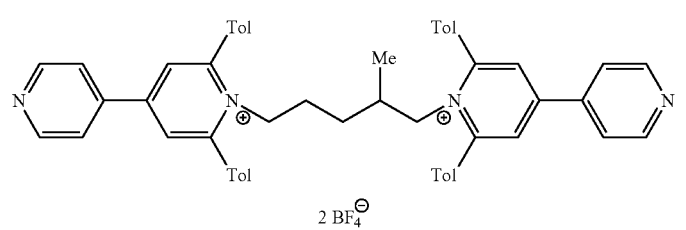 |

-continued
| Compound | Formula |
|---|---|
| IV-6 | 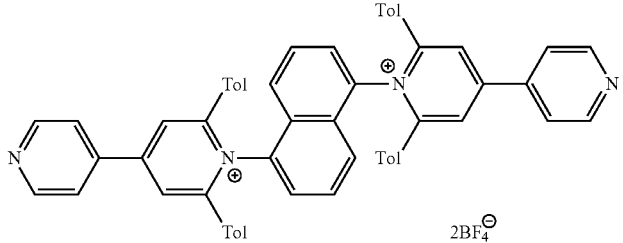 2BF$_4^\ominus$ |
| IV-7 | 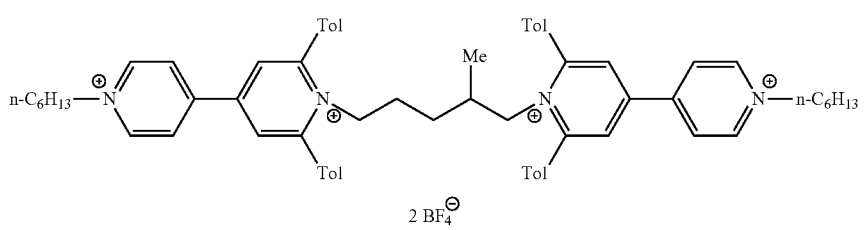 2 BF$_4^\ominus$ |
| IV-8 | 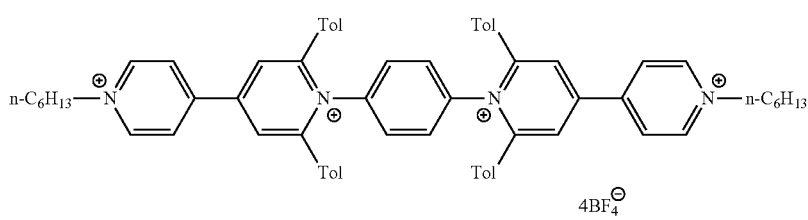 4BF$_4^\ominus$ |
| IV-9 | 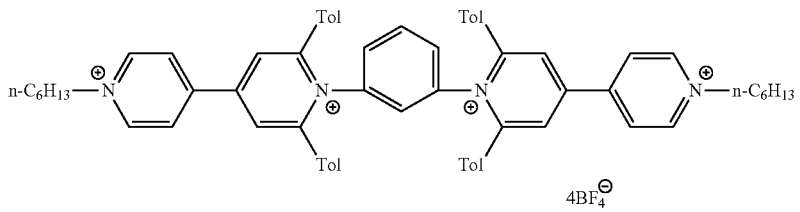 4BF$_4^\ominus$ |
| IV-10 | 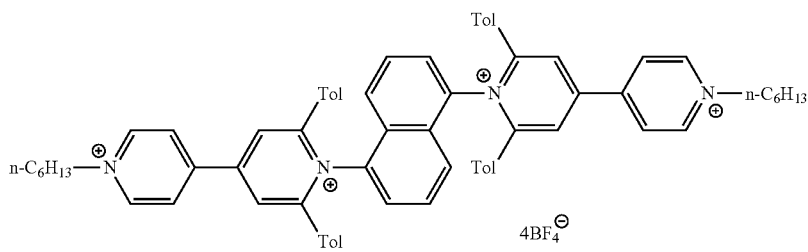 4BF$_4^\ominus$ |
| IV-11 | 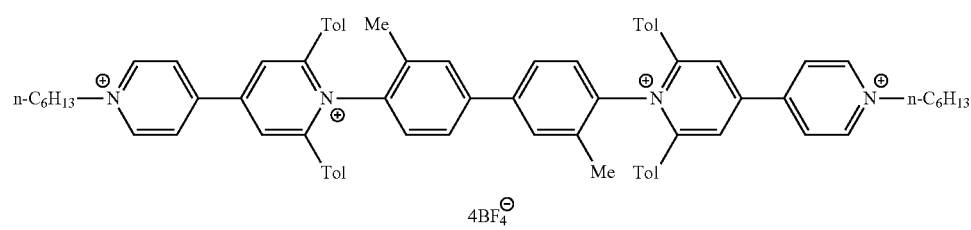 4BF$_4^\ominus$ |

| Compound | Formula |
|---|---|
| IV-12 | (structure shown) |
| IV-13 | (structure shown) |
| IV-14 | (structure shown) | wherein Me represents methyl, Ph represents phenyl and Tol represents 4-methylphenyl.

8. The electrochromic composition according to claim 1, wherein the reducing compound is selected from ferrocene and their derivatives such as ethyl ferrocene, t-butyl ferrocene; phenoxazine and their derivatives, such as N-benzylphenoxazine; phenazine and their derivatives, such as 5,10-dihydrophenazine, N,N,N',N'-tetramethyl-p-phenylenediamine; phenothiazine and their derivatives, such as 10-methylphenothiazine and isopropylphenothiazine; thioanthrene; and tetrathiafulvalene.

9. The electrochromic composition according to claim 8, wherein said composition comprises a fluid, mesomorphous or gel host medium preferably selected from the group consisting of: organic solvents, liquid crystals, polymers, liquid crystal polymers and mixtures thereof.

10. The electrochromic composition according to claim 1, wherein the dye is selected from the group consisting of:
- organic or inorganic photochromic and/or dichroic substances;
- electrochromic substances distinct from the first constituent of this invention and which may be selected among the above compounds of Formulas (I) and/or (II) or among different electrochromic compounds;
- organic and inorganic pigments, especially in the form of nanoparticles;
- organic dyes;
- optical brighteners;
- or mixtures thereof.

11. An electrochromic device comprising the composition as defined in claim 1.

12. The electrochromic device according to claim 11, wherein said electrochromic device comprises a mechanism for holding the composition in a mechanically stable environment.

13. The electrochromic device according to claim 11, wherein said electrochromic device comprises at least one transparent electrochromic cell comprising a pair of opposed substrates facing each other and forming a gap, and the gap is filled with the electrochromic composition as defined in claim 1.

14. The electrochromic device according to claim 11, wherein said electrochromic device is an optical article.

15. The electrochromic device according to claim 14, wherein the optical article is an optical lens or optical filter, window, visor, mirror or displays.

16. The electrochromic device according to claim 15, wherein the optical article is an optical lens.

17. The electrochromic device according to claim 15, wherein the optical article is an ophthalmic lens.

\* \* \* \* \*